United States Patent
Veres et al.

(10) Patent No.: US 10,702,868 B2
(45) Date of Patent: Jul. 7, 2020

(54) CENTRIFUGAL MICROFLUIDIC CHIP CONTROL

(71) Applicant: NATIONAL RESEARCH COUNCIL OF CANADA, Ottawa (CA)

(72) Inventors: Teodor Veres, Montreal (CA); Daniel Brassard, Longueuil (CA); Liviu Clime, Longueuil (CA); Francois Normandin, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 163 days.

(21) Appl. No.: 15/124,236

(22) PCT Filed: Mar. 4, 2015

(86) PCT No.: PCT/IB2015/051591
§ 371 (c)(1),
(2) Date: Sep. 7, 2016

(87) PCT Pub. No.: WO2015/132743
PCT Pub. Date: Sep. 11, 2015

(65) Prior Publication Data
US 2017/0036208 A1    Feb. 9, 2017

Related U.S. Application Data

(60) Provisional application No. 62/108,619, filed on Jan. 28, 2015, provisional application No. 61/949,298, filed on Mar. 7, 2014.

(51) Int. Cl.
*B01L 3/00* (2006.01)
*G01N 35/00* (2006.01)
(Continued)

(52) U.S. Cl.
CPC ...... *B01L 3/502746* (2013.01); *B01F 9/0003* (2013.01); *B01F 13/0059* (2013.01);
(Continued)

(58) Field of Classification Search
CPC ......... B01L 3/502746; B01L 3/502715; B01L 3/50273; B01L 7/52; B01L 2200/025;
(Continued)

(56) References Cited

U.S. PATENT DOCUMENTS 4,776,832 A   10/1988 Martin et al.
6,706,519 B1   3/2004 Kellogg et al.
(Continued)

FOREIGN PATENT DOCUMENTS

CA   2559778   10/2006
EP   1970565 A1   9/2008
(Continued)

OTHER PUBLICATIONS

Extended European Search Report, dated Nov. 8, 2017.
(Continued)

*Primary Examiner* — Anshu Bhatia
(74) *Attorney, Agent, or Firm* — Jason E. J. Davis; National Research Council of Canada

(57) ABSTRACT

A technique is provided for incorporating pneumatic control in centrifugal microfluidics. The technique involves providing a chip controller that has pressurized fluid supply lines for coupling one or more pressurized chambers of the controller with ports of a microfluidic chip. At least part of the chip controller is mounted to a centrifuge for rotation with the chip. A flow control device is provided in each supply line for selectively controlling the pressurized fluid supply, and is electrically controlled. Bubble mixing, on and off-chip valving, and switching are demonstrated.

79 Claims, 7 Drawing Sheets

(51) Int. Cl.

| | | |
|---|---|---|
| *B01F 9/00* | (2006.01) | |
| *B01F 13/00* | (2006.01) | |
| *B01F 13/02* | (2006.01) | |
| *B01F 15/00* | (2006.01) | |
| *B01F 15/02* | (2006.01) | |
| *G05D 7/06* | (2006.01) | |
| *G01N 35/04* | (2006.01) | |
| *B01L 7/00* | (2006.01) | |

(52) U.S. Cl.
CPC ...... *B01F 13/0222* (2013.01); *B01F 13/0277* (2013.01); *B01F 15/00357* (2013.01); *B01F 15/0261* (2013.01); *B01L 3/50273* (2013.01); *B01L 3/502715* (2013.01); *G01N 35/00029* (2013.01); *G05D 7/0635* (2013.01); *B01F 2215/0037* (2013.01); *B01L 7/52* (2013.01); *B01L 2200/025* (2013.01); *B01L 2200/143* (2013.01); *B01L 2200/146* (2013.01); *B01L 2200/147* (2013.01); *B01L 2300/087* (2013.01); *B01L 2300/0816* (2013.01); *B01L 2300/0867* (2013.01); *B01L 2300/1822* (2013.01); *B01L 2400/0409* (2013.01); *B01L 2400/0487* (2013.01); *B01L 2400/082* (2013.01); *G01N 2035/00158* (2013.01); *G01N 2035/0439* (2013.01); *G01N 2035/0449* (2013.01)

(58) Field of Classification Search
CPC ......... B01L 2200/143; B01L 2200/146; B01L 2200/147; B01L 2300/0816; B01L 2300/0867; B01L 2300/087; B01L 2300/1822; B01L 2400/0409; B01L 2400/0487; B01L 2400/082; B01F 13/0059; B01F 9/0003; B01F 13/0222; B01F 13/0277; B01F 15/00357; B01F 15/0261; B01F 2215/0037; G01N 35/00029; G01N 2035/00158; G01N 2035/0439; G01N 2035/0449; G05D 7/0635
See application file for complete search history.

(56) References Cited

U.S. PATENT DOCUMENTS

| | | | |
|---|---|---|---|
| 7,152,616 B2 | 12/2006 | Zucchelli et al. | |
| 7,440,684 B2 | 10/2008 | Spaid et al. | |
| 8,105,553 B2 | 1/2012 | Grossman et al. | |
| 8,105,824 B2 | 1/2012 | Facer et al. | |
| 8,257,666 B2 | 9/2012 | Quake et al. | |
| 8,303,911 B2 | 11/2012 | Siegrist et al. | |
| 8,449,830 B2 | 5/2013 | Claussen et al. | |
| 8,524,174 B2 | 9/2013 | Yobas et al. | |
| 2007/0059208 A1 | 3/2007 | Desmond et al. | |
| 2009/0269767 A1 | 10/2009 | Soderlund et al. | |
| 2009/0145576 A1 | 11/2009 | Wyrick et al. | |
| 2010/0239462 A1* | 9/2010 | Van't Oever | B01L 3/502707 422/68.1 |
| 2010/0298172 A1 | 11/2010 | Desmond et al. | |
| 2011/0085949 A1 | 4/2011 | Roy et al. | |
| 2012/0077260 A1* | 3/2012 | Sharon | B01L 3/502738 435/287.2 |
| 2013/0035223 A1 | 2/2013 | Reymond et al. | |
| 2013/0139899 A1 | 6/2013 | Galas et al. | |
| 2013/0317130 A1 | 11/2013 | Brassard et al. | |
| 2014/0134631 A1 | 5/2014 | Clime et al. | |

FOREIGN PATENT DOCUMENTS

| | | |
|---|---|---|
| EP | 2332653 A1 | 6/2011 |
| WO | 0177683 | 10/2001 |
| WO | 2011138748 | 11/2011 |
| WO | 2013003935 | 1/2013 |
| WO | 2013053039 | 4/2013 |
| WO | 20130120190 | 8/2013 |

OTHER PUBLICATIONS

Gorkin III, et al., Pneumatic pumping in centrifugal microfluidic platforms, Microfluid Nanofluid (2010), 9, 541-549.
Mark, et al., Aliquoting on the centrifugal microfluidic platform based on centrifugo-pneumatic valves, Microfluid Nanofluid (2011), 10, 1279-1288.
Haeberle, et al., Microfluidic platforms for lab-on-a-chip applications, The Royal Society of Chem., Lab Chip, 2007, 7, 1094-1110.
Zoval, et al., Centrifuge-based Fluidic platforms, Proceedings of the IEEE 92(1), 140-153.
Ducree, et al., The centrifugal microfluidic Bio-Disk platform, J. Micromech. Microeng. 17, 2007, S103-S115.
Chen, et al., A rotating microfluidic array chip for staining assays, Talanto 81(4-5), 1203-1208.
Date, et al., Integration of spore-based genetically engineered whole-cell sensing systems into portable centrifugal microfluidic platforms, Analytical and Bioanalytical Chem., 398, 349-356.
Melin, et al., Thermoplastic microfluidic platform for single-molecule detection, cell culture, and actuation, Anal. Chem. 2005, 77, 7122-7130.
Clime, et al., Thermo-pneumatic pumping in centrifugal microfluidic platforms, Microfluid Nanofluid 2011, 11, 643-652.
Clime, et al., Active Neumatic control of centrifugal microfluidic flows for lab-on-a-chip applications, The Royal Society of Chem., Lab Chip, 2015, 15, 2400-2411.
Mark, et al., Centrifugo-pneumatic valve for metering of highly wetting liquids on centrifugal microfluidic platforms, The Royal Society of Chem., Lab Chip, 2009, 9, 3599-3603.
Focke, M., F. Stumpf, et al., Microstructuring of polymer films for sensitive genotyping by real-time PCR on a centrifugal microfluidic platform, The Royal Society of Chemistry, Lab on a chip 10(19), 2519-2526.
Jia, G., et al. (2004), CD (compact disc)-based DNA hybridization and detection, Proc. SPIE 5455, MEMS, MOEMS, and Micromachining, 2004, 341.
Jokinen, V., et al., Capillarity in microfluidic channels with hydrophilic and hydrophobic walls, Microfluidics and Nanofluidics (2008) 5(4), 443-448.
Kong, et al., A Valveless Pneumatic Fluid Transfer Technique Applied To Standard Additions on a Centrifugal Microfluidic Platform, Analytical Chemistry, (2011), 83(23), 9186-9190.
Madou, et al., Lab on a CD, Annual Review of Biomedical Engineering, M. L. Yarmush, 2006 (8) 601-628.
Siegrist, et al., Serial siphon valving for centrifugal microfluidic platforms, Microfluidics and Nanofluidics, 2010, (9) 55-63.
International Preliminary Report on Patentability of corresponding PCT application No. PCT/IB2015/051591.
Shu-Sheng Lin, Wei-Hao Lian, Chen-Lin Chen, Cheng-Wei Yang, Andrew M. Wo; A Multifunctional Vent Vlve System in a Centrifugal Microfluidic Platform, Institute of Applied Mechanics, National Taiwan University, Taipei, Taiwan.

* cited by examiner

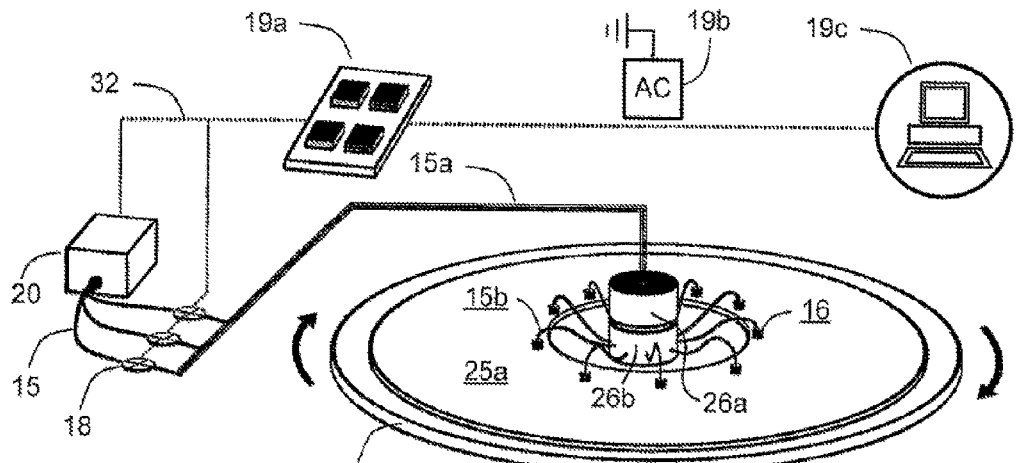
FIG. 10
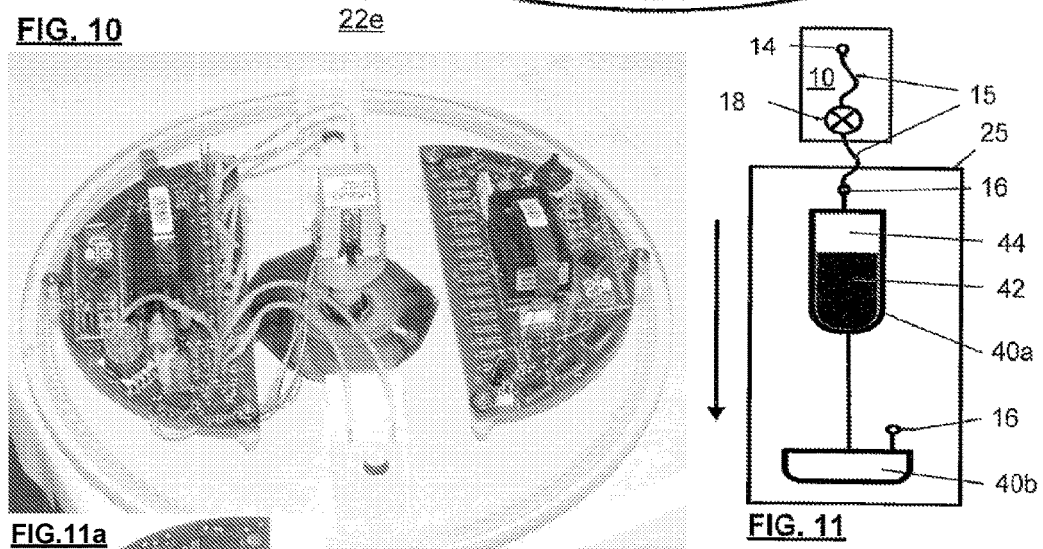
FIG.11a
FIG. 11
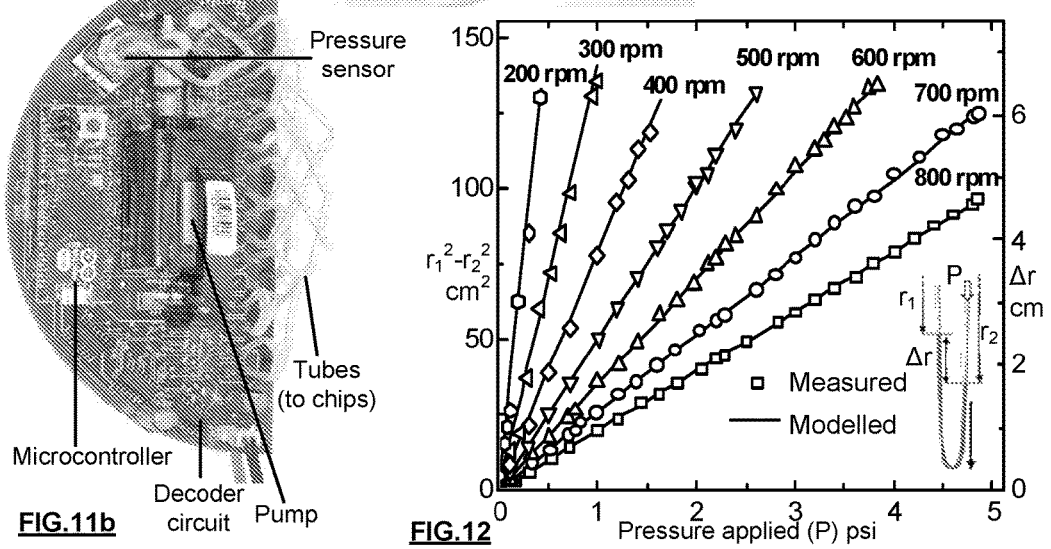
FIG.11b
FIG.12

CENTRIFUGAL MICROFLUIDIC CHIP CONTROL

CROSS-REFERENCE TO RELATED APPLICATIONS

This application is a national phase entry of International Patent Application PCT/IB2015/051591 filed Mar. 4, 2015, which claims the benefit of U.S. Provisional Patent Application Ser. No. 61/949,298 filed Mar. 7, 2014 and U.S. Provisional Patent Application Ser. No. 62/108,619 filed Jan. 28, 2015.

FIELD OF THE INVENTION

The present invention relates in general to centrifugal microfluidic devices, and in particular to a controller for centrifugal microfluidic chips for mounting with the chip to a centrifuge, the controller providing at least pneumatic control for the chip.

BACKGROUND OF THE INVENTION

Microfluidic chips, such as labs on chip (LOCs), including micro-Total Analysis Systems (IJTAS), are increasingly being used for small volume sample testing in a wide variety of fields, such as medicine, pharmaceutical research, food and water analysis, pathogen detection, etc. A great number of processes (filtration, thermal processing, mixing, loading and rinsing, reacting, SPR, PCR, etc.) have been demonstrated on a variety of substrates for a variety of test materials. Remarkable results can be obtained with the precise control and manipulation of volumes of liquids of only a few microliters.

A droplet of an aqueous solution/suspension (the most common liquid used in microfluidics) or an oil, will exhibit surface tension that results in beading. Herein liquid refers to a liquid or a liquid that suspends, contains or surrounds solids or gasses, be it as a suspension, solution, colloid, dispersion, or with less regularity, e.g. as beads in a stream. Surface tension of the liquid tends to lead to beading, which can make it difficult to control movement of the microfluid, as it may stay in a part of a chamber and not approach a desired exit, and the separation of beads leads to uncoordinated movement of the fluid. Generally the force of gravity is, in itself, insufficient to draw fluid through microfluidic channels, and air pressure differences have a much greater effect.

It is known to provide walls of the microfluidic channels that are hydrophilic or hydrophobic, as these can improve control of movement of fluids, for example by capillary effect. It is difficult to treat many materials to be hydrophilic, or hydrophobic. For materials that are amenable to such treatment, the effect may remain only for a given time, which leads to a short life for the microfluidic device. Furthermore, reliability of the treatment may be lacking: some chips may exhibit a lack of hydrophilicity or hydrophobicity having encountered similar storage regimens. Sometimes making the walls bond with the fluid results in interactions with the fluid that may contaminate, dilute, or otherwise alter the liquid. Furthermore, requiring that a liquid be hydrophilic or hydrophilic may have drawbacks for particular reactions or reagents.

Accordingly there have been many applications that use pneumatics to control movement of fluids through microfluidic chambers. These may roughly be divided into two groups: direct pneumatic control (e.g. WO 0177683 to Chow et al.), where the same microfluidic channels that transport fluids are in contact with pressurized gas, and pneumatic control layer that overlies a microfluidic chip, applying pressure to expand or contract the channels (e.g. Applicant's co-pending U.S. Ser. Nos. 12/588,236, 13/643,426, and 13/985,317). There are limits on how well fluid can be controlled in complex microfluidic chips with only controlling pressure at a fixed number of ports of a chip. A modestly complex process with a few liquid sources and reaction chambers typically requires a fairly large number of pressure supply lines that substantially increase a complexity of the equipment required for operation, resulting in a large network of pressure supply lines and attendant equipment.

One disadvantage of this technique is the cumbersome equipment that is required to operate a microfluidic chip. In the background of WO 2013/053039, Gray et al. notes that microfluidic pneumatic valving requires a large amount of support equipment to drive arrays of valves, resulting in a "chip-in-lab" situation rather than a self-contained "lab-on-chip".

Centrifugal microfluidics is a branch of microfluidics that uses a centrifugal field to control movement of fluids within a microfluidic device: a microfluidic chip is mounted to a centrifuge. The centrifuge produces a centripetal field that varies continuously across the microfluidic chip, and draws the fluid to a lowest part of any chamber they are in (i.e. away from the center of rotation), or more generally, to whatever supporting wall is available (in the absence of which the fluid accelerates). The field has developed an array of chips, protocols, and tests, including lime staining assays (Chen, Li et al. 2010 "A rotating microfluidic array chip for staining assays." Talanta 81(4-5): 1203-1208), whole cell sensing (Date, Pasini et al. 2010 "Integration of spore-based genetically engineered whole-cell sensing systems into portable centrifugal microfluidic platforms" Analytical and bioanalytical chemistry 398: 349-356.), real-time PCR (Jia, Ma et al. 2004), and single molecule detection (Melin, Johansson et al. 2005 "Thermoplastic microfluidic platform for single-molecule detection, cell culture, and actuation" Analytical chemistry 77(22): 7122-7130).

Spatial and temporal control of liquids in centrifugal microfluidic devices have been achieved by controlling in-plane structure of the microfluidic channels, as well as wetting properties of the materials used for fabricating the chips (Zoval and Madou 2004 "Centrifuge-based fluidic platforms." Proceedings of the IEEE 92(1): 140-153; Lu, Juang et al. 2006 Superhydrophobic valve for microfluidics. Annual Technical Conference—ANTEC, Conference Proceedings, Charlotte, N.C.; Ducree, Haebrle et al. 2007 "The centrifugal microfluidic Bio-Disk platform." Journal of Micromechanics and Microengineering 17(7)). Valving is achieved by capillary valves and siphon valves. Applicant has a co-pending application on metering and time control in centrifugal microfluidics (W02013/003935). Some centrifugal microfluidic devices have valves that are designed to control release of liquids at different places or at different rotation frequencies of the centrifuge. Thus there are many applications that can be provided using centrifugal microfluidics.

Nonetheless there are limitations on the existing methods of control in centrifugal microfluidics. As mentioned above, the use of surface treatments to control wetting has problems, and control of the liquid (by siphon valves or capillaries) is sensitive to wetting (contact angle of the liquid). There are important limits on what liquids will be valved. Furthermore there are limits to locations where capillary valves can be positioned because of their burst frequencies.

Uncertainty of contact angle hysteresis is another issue. Accordingly a very small number (e.g. not more than 3) of capillary valves can operate at a required separation for the rotation speeds of typical centrifuges to avoid overlapping operations for typical device footprints. Timing may become an important constraint with some siphon valves, as siphon valves work by retarding flow, without discrete stops. In those siphon valves that can stop fluid flow permanently, a control over an angle of the chip with respect to the centrifugal field is required. Each valve provides an independent set of time constraints that depend on the liquid and surface treatment. This means that a duration of the effective valve limits how long other processes must be completed, which adds constraints to the design of the microfluidic process for which a chip is designed. Finally the geometry and surface treatments are both important features and it can be complicated to control capillary valves accurately, even for a narrow range of liquids, as patterning defects can cause additional variability.

In addition to these problems, there are other issues with control over liquids in centrifugal microfluidics, in that unidirectional flow is generally a problem, mixing is difficult to accomplish (although a good solution is taught by Applicant in WO 2013/0120190), and problems with loading and unloading liquids can require complex ancillary equipment.

US 2007/0059208 to Desmond teaches a rotating fluid processing device to move fluids introduced into input chambers radially outward through pathways. Desmond teaches introducing the fluids in a variety of ways, but these have to be performed prior to chip rotation.

U.S. Pat. No. 7,152,616 to Zucchelli et al. teaches, with regards to FIG. 6, use of a centrifugal microfluidic chip having air plugs to move liquid from an outer to an inner radial position, which is referred to as "reflow". The reflow appears to be controlled by perforating a material layer when the centrifuge is not in operation. As the centrifuge controls fluid movement across the chip, and the operation of the reflow, it is impossible to independently control the movement of the fluids (away from the reflow area), and the reflow. The chip space required to enable limited reflow, and the constraints on channels in accordance with this technique are considerable disadvantages. Other similar approaches have been discussed, including Gorkin III, Clime et al. 2010 "Pneumatic pumping in centrifugal microfluidic platforms." Microfluidics and Nanofluidics 9: 541-549, and thermal expansion of gasses in non-contact heated reservoirs (Abi-Samra, Clime et al. 2011 "Thermo-pneumatic pumping in centrifugal microfluidic platforms." Microfluidics and Nanofluidics 11(643-652)).

Previously noted WO 2013/053039 to Gray et al., teaches a 2D array of microfluidic channels interconnecting wells with a number of electronically controlled valves at intersections between the channels, to produce a reconfigurable fluid routing track between the sample wells. As noted by Gray et al., "When scaled to microscale fluidic channels, surface tension, capillary forces, and other fluid dynamics become major considerations. Microfluidics applications usually require external pressure sources through pumps or centrifugal force; or electrokinetics for flow." Gray et al. teach using magnetic pumping as the source for driving fluids.

Gray et al. notes an importance of separating contaminated elements of a microfluidic system, from reusable parts, and specifically defines cartridges for the microfluidics, that include the 2D array. The advantage of reconfigurability offered by this system may not warrant the costs of producing these cartridges. The cartridges require patterning and soft lithography, as well as impregnation with magnetic particles, and inlaid hydro-gel based microactuated valves. The production of these cartridges will therefore be expensive, and require many supplies and many electrical connections. The cartridges would be too expensive single-use items for many applications. Additionally, the hydrogel microvalves may be reactive with certain microfluids under assay. High voltages, and magnetic fields, are required for fluid control, and very slow movement of the microfluids are observed, leading to very slow processes, if the fluid must move from one chamber to another, or mix with reagents, etc.

Some prior art efforts have been made to combine the advantages of centrifugation with pneumatics. For example, Kong and Salin 2011 "A Valveless Pneumatic Fluid Transfer Technique Applied To Standard Additions on a Centrifugal Microfluidic Platform." Analytical Chemistry 83(23): 9186-9190 teaches a pneumatic fluid transfer technique that uses compressed gas to generate a pneumatic force that works with the centrifugal force to direct fluid flow through a chip while the chip is under centrifugation. Kong and Salin teach blowing compressed air from a fixed external reservoir onto a surface of a rotating microfluidic chip. Liquid in the chip experiences a force pulse each time an access port on the surface passes across the stream blown by the external reservoir through a thin tube (nozzle). A solenoid valve is used for switching the pressure on and off, according to the paper. While this was demonstrated to be a useful technique for a relatively simple problem, it is not trivial to provide temporally accurate delivery of fluid in time with low cost pneumatic supplies, where the pressurized fluid supply is intermittently connected to the vent during rotation of the chip.

Accordingly, there is a need for a centrifugal microfluidic chip control that allows for more efficient microfluid control than centrifugal, or pneumatic techniques permit independently, and particularly to control that allows for processes to be performed with less user-intervention or avoid one or more identified limitations with the prior art.

SUMMARY OF THE INVENTION

Applicant has discovered a technique for providing independent pneumatic and centrifugal control over a microfluidic chip. The combination of these two controls allows for operations on chips that have never been reported, and offer many possibilities that were difficult or impossible to reach using previous knowledge.

Accordingly a microfluidic chip controller is provided, the chip controller comprising: a body having a coupling for mounting to a centrifuge while permitting concurrent mounting of a microfluidic chip to the centrifuge, so that the body and chip are rotatable by the centrifuge, the body having a first opening to a first pressurized fluid supply; a pressurized fluid supply line having first and second ends, the first end in fluid communication with the first opening, and the second end adapted for fluid communication with a port of the chip; a flow control device in the supply line for selectively controlling the pressurized fluid supply at the second end; and an electrical circuit for controlling the flow control devices. Therefore the microfluidic chip controller mounted with the chip to the centrifuge, with the supply line connected to the port of the chip, allows for controlled delivery of pressurized fluid into the chip during centrifugation.

The first pressurized fluid supply may have a density that is higher or lower than a microfluid for which the chip is designed, and low miscibility or solubility with the microfluid. The first pressurized fluid supply may hold pressurized gas. The gas may be an inert gas selected for non-reactivity with reactants and substrates used in an intended process for the chip, such as a purified or sterilized air, or nitrogen. The gas may have an absolute pressure of 0.1 to 2.5 atmospheres, or 0.5 to 0.997, or 1.003 to 2 atmospheres, or 1.003 to 1.8 atmospheres. The gas may have an ambient pressure, or a pressure at least 0.003 atmospheres above or below ambient.

The microfluidic chip controller may further comprise at least 2, at least 3, at least 4, or at least 8, pressurized fluid supply lines, each communicating with the one or more pressurized fluid supplies at a respective first end, and providing, at second a respective second end, a coupling for sealed mounting to a port of the chip. Each of the pressurized fluid supplies may be adapted to be independently maintained at different pressures.

The coupling for mounting the control system to a centrifuge may provide a mechanical attachment to a blade of a centrifuge at a position that does not interfere with a mounting position for the chip on the blade, or a mechanical attachment to a chip mounted to a blade of a centrifuge. The body may have a part shaped for mounting or supporting at least a part of the chip. The coupling may permit concurrent mounting of a plurality of chips to the centrifuge. The first supply line may branch to provide at the second end, a plurality of couplings for fluid connections to first ports respectively on each of the plurality of chips. The mounting may comprise a joint allowing for a pivoting of the chip with respect to the blade.

The electrical circuit may further comprise an electrical lead for coupling with an electrical component on the chip adapted to: supply power to, or provide signaling to the electrical component.

The microfluidic chip controller may comprise a mechanical actuator for controlling a motion of the chip in a plane of rotation of the centrifuge, the motion including at least a 5° rotation of the chip projected on the plane.

One or more of the pressurized fluid supplies may comprise an enclosed pressurized chamber, or a pressurized chamber in communication with a negative or positive pressure source, such as a pump. The pump may be mounted to the chip controller, for example, near a centre of rotation of the blade to limit a moment on the blade. The electrical circuit may be adapted to control the pump. A power supply for the pump may be mounted to the chip controller, or may be provided off of the blade, connected to the pump by an electrical contacting rotational coupling, such as a slip ring. The negative or positive pressure source may be provided off of the blade, and the chamber may be coupled to the pump via a pneumatic slip ring.

The body may comprise a rotor of a slip ring mounted for rotation with the centrifuge and a stator to define a slip ring. A plurality of pressurized fluid supplies may be provided to respective chambers via a plurality of slip rings.

The microfluidic chip controller may have at least one electrical contacting rotational coupling that couples the electrical circuit with a stationary controller, for supply of control signaling, data, and electrical power.

The microfluidic chip controller may further comprise a sensor or actuator mounted to the body and/or the chip, for measuring or affecting a property of the chip or a liquid contained therein. The sensor or actuator may be connected to the electrical circuit, and may give feedback regarding a position of a fluid within the chip, or change a position of a fluid in the chip. The sensor or actuator may be a chemical, physical, or electronic sensor or actuator, including a temperature sensor or regulator, fluid dynamic sensor or regulator, or an optical sensor or emitter.

One of the chambers may be adapted to be maintained at a given pressure, using a pressure sensor and feedback for selectively coupling the chamber to a negative or positive pressure source, e.g. by selectively operating a pump. Two of the chambers may be maintained at different pressures.

Also accordingly, a method for controlling a pressurized fluid supply in a microfluidic chip is provided. The method comprises: mounting a microfluidic chip control system to a centrifuge and mounting of a microfluidic chip to the centrifuge, so that the mounting and chip are rotatable by the centrifuge; providing the control system with at least one pressurized fluid supply; coupling a pressurized fluid supply line communicating between the at least one chamber and a port of the chip; and operating a flow control device in the supply line for selectively controlling the pressurized fluid supply to the chip.

The pressurized chamber may supply a pressure greater than ambient, to a chamber below a meniscus of a liquid in the chamber while the centrifuge is operating, to bubble the liquid.

Operating the flow control device may comprise applying a pressure difference between a first and a second port of the chip to bubble a liquid in a reservoir on the chip, where the first port is coupled to the reservoir below a meniscus of the liquid, the second port is coupled to the reservoir above the meniscus, and the pressure applied at the second port is lower than that applied at the first port Operating the flow control device may comprise applying a pressure to a channel to move a liquid from a first reservoir connected with the channel to a second reservoir. The second reservoir may be closer to an axis of rotation of the centrifuge than the first reservoir. The first reservoir may be in a vial off of the chip, and the second reservoir may be on the chip. Applying the pressure to the channel to move the liquid comprises priming a siphon valve. Operating the flow control device may comprise operating a plurality of flow control devices in a plurality of supply lines to selectively move the liquid in one of two or more directions Also accordingly, a kit is provided. The kit comprising user instructions at least one of the following: for carrying out the method as described above; a chip controller as described above; and non-transitory computer readable program instructions for controlling flow control devices of a chip controller according to the method described above. The kit may further comprise tubing for connecting a port of the microfluidic chip with the supply line, the microfluidic chip, a blade for a centrifuge, or a centrifuge.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 10 is a schematic illustration of a tenth embodiment of the invention where the chip controller includes a pneumatic and electronic slip ring;

FIG. 11 is a schematic illustration of a chip having centrifugal control and pneumatic control applied by selectively opening a valve to ambient pressure;

FIGS. 11 a,b are images of chip controllers used to test the present invention;

FIG. 12 is a plot of liquid displacements (measured and predicted) at different rotation speeds and applied pressures.

DESCRIPTION OF PREFERRED EMBODIMENTS

Herein a technique is described for controlling liquid within a microfluidic chip. The technique involves application of pneumatic pressure while the fluid is also subjected to a centrifugal field.

Figure 1:
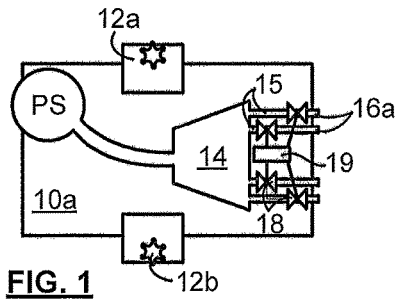
FIG. 1 is a schematic illustration of a chip controller in accordance with a first embodiment of the invention.

FIG. 1 is a schematic illustration of a microfluidic chip controller 10a in accordance with an embodiment of the present invention. Herein a number of embodiments are shown and described. Like reference numerals refer to features having a common function and descriptions are not repeated for such elements in discussion of each drawing. The embodiments illustrate a variety of alternatives. Each alternative is readily combinable with each other alternative, even if no specific embodiment is shown having that pair of alternatives.

Microfluidic chip controller 10a is a body with a pair of clamps 12a that serve for mounting the controller 10a to a blade of a centrifuge (not in view). Herein blade refers to a rotating part of the centrifuge, regardless its shape. Naturally the mounting could be in a wide variety of forms well known in the art. The clamps 12a have vice drivers 12b for tightening the clamp in place over a suitable blade. Clamps 12a are naturally designed for mounting to a particular blade or range of sizes of blades, in a particular way that permits concurrent mounting of a microfluidic chip to the centrifuge, so that the mounting and chip are rotatable by the centrifuge.

The body has a pressurized fluid chamber 14 that is in fluid communication with each of 4 pressurized fluid supply lines 15 that extend from the chamber 14, and end at respective ports 16a on an edge of the body. The ports 16a are a first example of a coupling for sealed mounting to a port of the chip, although naturally any number of other interfaces can be used. Between each port 16 and the chamber 14, an electronically controlled valve 18 is provided to selectively open or close the port 16 to the chamber 14. The valves are a first example of a flow control device for selectively controlling delivery of pressurized fluid supply through the port 16. The valves may be two-state valves: open and closed, or may have a variably control for allowing a controlled leakage across the valve in one state, and a full communication of the pressure in an open state. Furthermore a switch may be incorporated with valves, such as in a three-way valve known in the art, or in more complicated devices. It will further be noted that no actual valve is required. A switch that selectively couples a connection from the chamber 14 to either a second connection to the chamber 14 (or other), or a supply line 15, will have exactly the same effect as a switch.

An electronic controller 19 is provided with circuitry for controlling the state of the valves 18 independently, via electrical signaling connections between the valves 18 and the electronic controller 19. The electronic controller 19 may further have signaling or timing information for determining a programmed sequence of operations of the valves 18 in accordance with an established protocol, or may be responsive to another controller, which may also direct the operation of the centrifuge, and any other sensor, actuator, or electronic device used on the chip, on the chip controller 10, or on the blade. As the active pneumatic components are in place, it becomes straightforward to integrate various other electrical control elements on the chip, including pressure sensors, pressure regulators, heating elements, temperature sensors, electrochemical sensors, and optical or fluorescence detectors, for example.

A pressure supply PS is schematically illustrated as being coupled to the chamber 14. This can be accomplished in a variety of ways. For example, PS can be a tank or pump that is used to inflate or pressurize the chamber 14 when the chip controller 10a is off-line, and the chamber has a coupling that ensures that the pressure is suitably retained within the chamber 14 until it is used. Another possibility is that the PS includes a collector aperture for receiving a jet of gas from a stationary source, as described by PRIOR ART. Alternatively the PS may be a slip ring coupler, or a mounted pump, as shown in embodiments below.

A large pressure difference between ambient is not required for many actions on the liquid in a microfluidic chip. About 1-3% above or below ambient pressure, can be sufficient to move liquid in a microfluidic chip by a useful distance on a chip. The chamber 14 may have a large volume, to minimize a change of its pressurization during the opening and closing of supply lines 15 in use. The volume may be elastic, or fixed. If the pressurized chamber is kept at ambient pressure, the chamber 14 may be very small, e.g. on the scale of a valve stop. An on-board (i.e. on the chip controller 10, blade, chip or any other part that revolves with the blade) or off-board pump may be used to repressurize the chamber 14 between uses, or otherwise maintain the pressure in the chamber 14 at a fixed, or desirably varying pressure.

Figure 2:
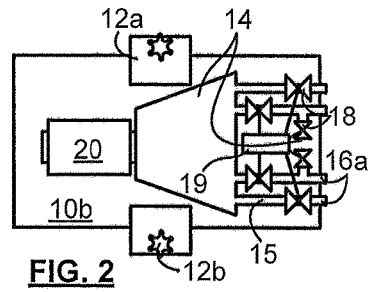
FIG. 2 is a schematic illustration of a chip controller in accordance with a second embodiment of the invention having an on-board pump.

FIG. 2 is a schematic illustration of a 2nd embodiment of a chip controller 10b. Two principal differences with the 1st embodiment are that the 2nd embodiment has an onboard pump 20, and second and third chambers 14, which are located in two additional valves 18. The pump 20 may be designed to maintain the large chamber 14 at a fixed pressure, and may have a sensor with feedback for accomplishing this. The two additional valves are shown smaller, but need not be. These additional valves selectively open 2 of the 4 supply lines 15 (inner as shown) to ambient pressure.

The 1st and 2nd embodiments can be designed for mounting to a blade of a centrifuge in substantially any manner that allows for sufficiently rigid connection and for coupling of the respective supply lines to respective ports of the chip that is also mounted to the blade. The chip controller 10 may mount edgewise to the blade, on a flat part of the blade, near a radially inward (top), mid, or radially distal (bottom) edge of the blade, for example. There is typically an advantage to mounting nearer the top, as the weight of the chip controller does not contribute as much to the centrifugal load of the blade at that position. Furthermore, slip rings for electrical, pressurized fluid or other supply, are provided coaxial with the center axis of the centrifuge, which makes an area around the centre of the centrifuge a good location for mounting. The mounting of the chip controller may necessarily precede or follow the mounting of the chip, or the chip and controller may be independently mounted. As such the chip may be retained by, or overlaid by, the chip controller 10, the chip may retain or overly the chip controller 10, or neither may contact the each other.

Figure 3:
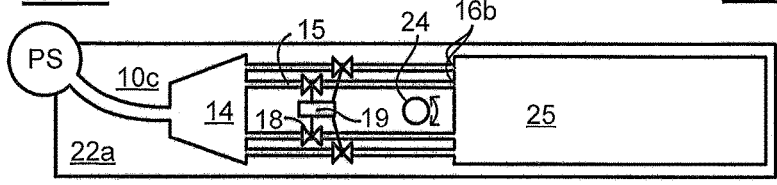
FIG. 3 is a schematic illustration of a chip controller that is integrated with a centrifuge blade, in accordance with a third embodiment of the invention.

FIG. 3 schematically illustrates a blade 22a of a centrifuge with an integrated chip controller 10c at one end (left) and a microfluidic chip 25 in fluid communication with the supply lines 15. The ports 16b for sealed coupling of the supply lines 15 to the chip 25 are located a top edge of the chip 25. The supply lines 15 are edge mounted to the chip 25. A through-bore 24 is provided for mounting the blade 22 to a centrifuge.

Figure 4:
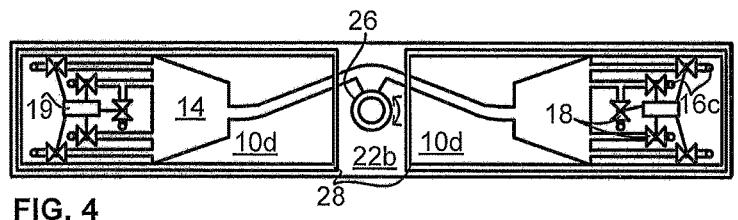
FIG. 4 is a schematic illustration of a fourth embodiment of the invention, that integrates two chip controllers with a centrifuge blade and has chips stacked on the chip controllers.

FIG. 4 schematically illustrates a blade 22b having two integrated chip controllers 10d different from 10c in that there are 5 instead of 4 supply lines 15, in the position and orientation of the ports 16c for sealed connection with microfluidic channels of the chip (not shown), and in the fact that the pressurized source is a slip ring 26 which covers the through-bore, and serves as the mounting to the centrifuge. It will be noted that one of the supply lines bifurcates to provide the additional supply line 15.

A fence 28 defines a holder for a microfluidic chip that is designed to be mounted on top of the chip controller 10d. This stacking arrangement is convenient spatially. The chip has ports aligned with the ports 16c for sealed coupling when the chip is placed in the chip holder. A smooth surface may be provided over the controller 10d for easy mounting to the chip, or a sealing ring may be provided around each chip port to ensure that a seal is provided around each port 16c.

This embodiment shows parallel chip controllers 10d that do not have any common equipment except for a slip ring manifold. The embodiment of FIG. 6 shows a single chip controller for two chips.

Figure 5:
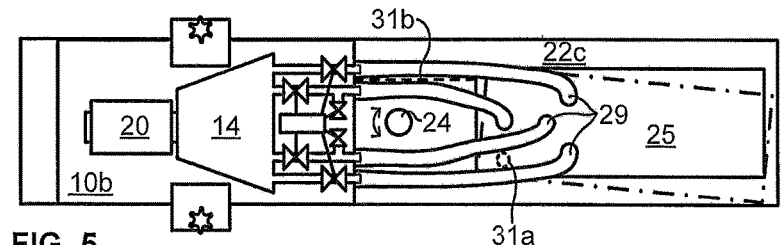
FIG. 5 is a schematic illustration of a fifth embodiment of the invention, with flexible tubing coupling the chip controller of FIG. 2 to a chip mounted to a blade.

FIG. 5 is a schematic illustration of the chip controller 10b mounted to a blade 22c of a centrifuge with a chip 25. The ports of the chip controller 10b are connected to ports of the chip 25 using plastic tubing 29. While the illustrated embodiment has one tube 29 for each port coupling, it will be appreciated that tubes may bifurcate to be coupled to the chip 25 at two or more ports, and that a special purpose multi-path connector may be used for coupling more than one port of the chip controller 10 to respective ports of the chip 25.

An optional feature of FIG. 5 is a passive swivel that mounts the chip 25, the swivel being actuable by varying a centrifugation rate (schematically shown by dotted lines), in accordance with the teachings of Applicant's co-pending patent application number not yet assigned, the contents of which are incorporated herein by reference. The passive swivel is provided by a 1 degree of freedom joint 31a that is essentially a free joint permitting rotation of the chip 25 in a plane of centrifugation, and an elastomeric line 31 b, that counterbalances a centripetal force. It will be appreciated that a wide variety of actuable mountings can be provided, and these may alternatively be driven by electronics of the chip controller, and/or monitored by sensors in communication with the chip controller. It will further be noted that the swivel mounting may collectively move the chip controller and the chip, which may avoid a requirement for flexibility of the couplings between the chip and controller illustrated as tubes 29 in the present embodiment.

Figure 6:
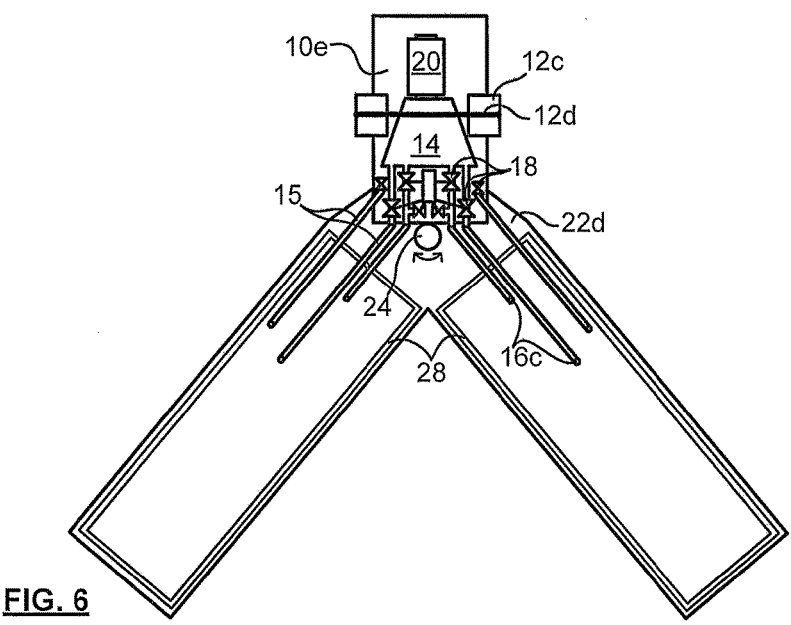
FIG. 6 is a schematic illustration of a sixth embodiment of the invention showing three kinds of pressure control lines, and a Y configuration.

FIG. 6 schematically illustrates a chip controller 10e different from 10b in a shape of the supply lines 15, and in that a band clamp is used to hold the chip controller 10e to a V-shaped blade 22d. Furthermore the chip controller 10e has three sets of supply lines 15, one set that is coupled by a valve 18 to only the chamber 14, one set that is coupled by valve 18 only to ambient pressure, and one set that is coupled via two valves to either the ambient pressure or chamber 14. It will be appreciated that the ambient air may serve as the pressure supply alone, or a positively or negatively pressurized chamber can be used. While larger and deformable chambers have certain advantages in terms of retaining pressure for more operations, small chambers can save space, and are effective if the pressure supply is quick to restore a desired pressure. The band clamp is provided by a band 12d and a set of support blocks 12c that have a groove for receiving the band 12d.

Figure 7:
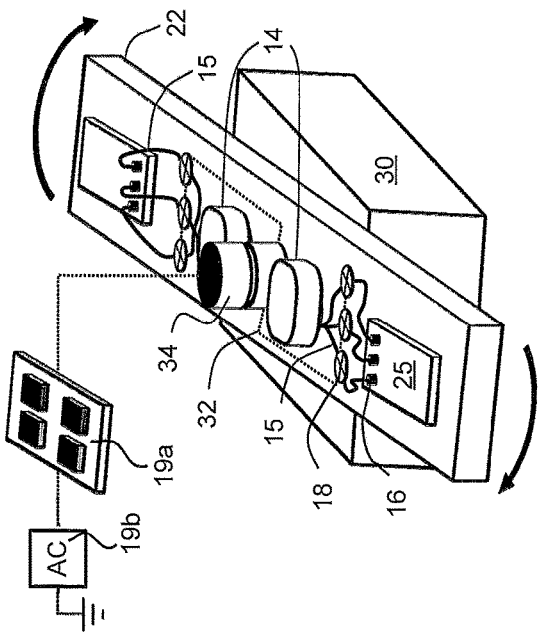
FIG. 7 is a schematic illustration of a seventh embodiment of the invention showing mounting of a blade to a centrifuge, and an electrical slip ring.

FIG. 7 is a schematic illustration of an embodiment of the present invention mounted to a centrifuge 30. In this embodiment, two chips and two sets of three independent valves are mounted on each side of a blade 22. An electrical slip ring 34 permits a stationary electronic controller 19a and power supply 19b to be used to control respective valves 18, which are independently addressable via bus 32, as opposed to a lightweight, portable power supply. While the power supply 19b is shown to be separate from the electronic controller 19a, it will be appreciated that a wide variety of electrical control equipment in 1 or more parts may provide equivalent functionality. The chamber 14 is a canister with filling means (not shown) to act as a pressure supply for the system.

Figure 8:
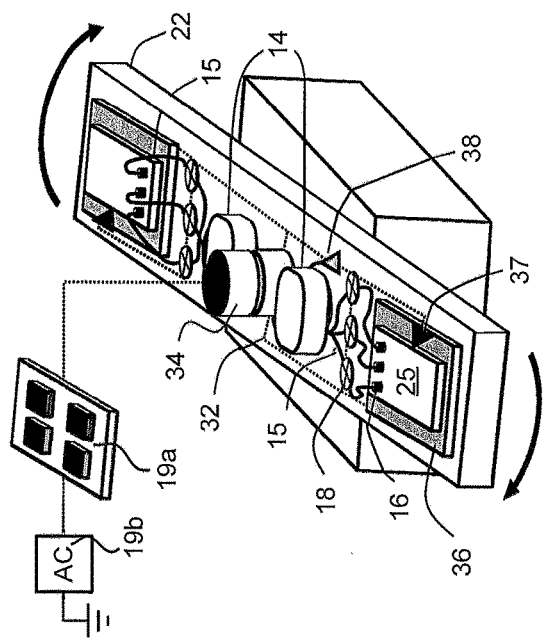
FIG. 8 is a schematic illustration of an eighth embodiment of the invention showing additional sensors and actuators.

FIG. 8 is a schematic illustration of the embodiment of FIG. 7 with a couple of optional features. Thermal control pad 36, which is also in communications with electronic controller 19a is adapted to apply heating (although in other embodiments it may supply cooling or either cooling or heating, as per demand) for example to maintain the chip 25 at a desired temperature, as is required for many protocols. Preferably the thermal control pad 36 has a temperature sensor 37 for regulation of the thermal output, and may preferably be sensitive enough to determine whether an endo- or exothermal reaction is taking place on the chip 25.

The temperature sensor 37 is in communications with the electronic controller 19a via the bus 32, for logging of the temperature data, and may be further used to delimit phases of the process performed on the chip 25.

While the sensor 37 was illustrated to be a temperature sensor, and to be used in a feedback of a particular thermal system, it will be appreciated that a wide variety of sensors could be used for monitoring operations on the chip 25, including, pressure, volume, crystallization, mass distribution, flow, magnetic field, optical properties, or chemical properties. The sensor may provide feedback for control over the operation of the chip 25 (including the revolution rate, or flow control such as by the valves 18, or operation of one or more actuators, such as the thermal control pad 36, or like thermodynamic, chemical, mechanical, electric, magnetic or electromagnetic actuator for affecting the chip 25 or its content).

A pressure sensor 38 is provided for monitoring a pressure within the chamber 14, and is used in more precise control over the valves 18, for better accuracy of pneumatic control over the chip 25.

Figure 9:
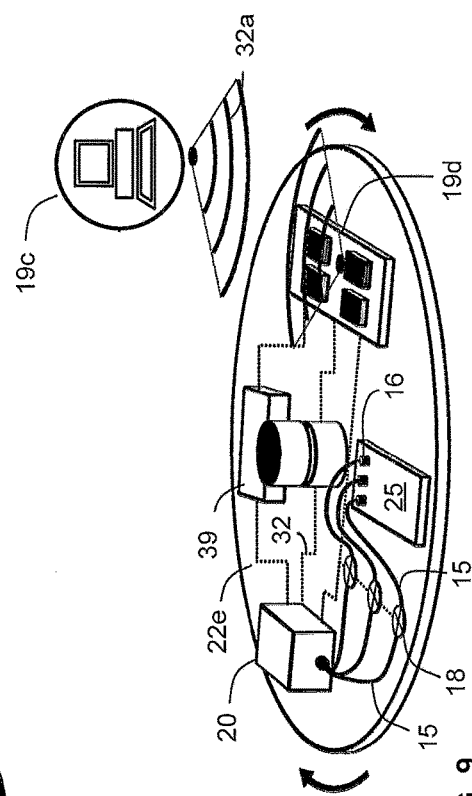
FIG. 9 is a schematic illustration of a ninth embodiment of the invention showing electromagnetic communications between a chip controller and computer.

FIG. 9 is a schematic illustration of an embodiment with blade in the form of a disk 22e. A pressurized fluid supply in this embodiment includes an on-board pump 20 which houses chamber 14. The pump 20 and an on-board electronic controller 19d are powered by a power supply 39, which may be a simple battery. The on-board electronic controller 19d is in wireless communications (32a) with a computer 19c, and communicates with the electronically controlled elements of the chip controller via bus 32.

FIG. 10 schematically illustrates a further embodiment in which a blade 22e supports a large chip 25a. The chip 25a has 10 ports 16 coupled to 10 rotor supply lines 15b, each of which extending from a respective outlet of a rotor 26b of an electronic/pneumatic slip ring. The rotor effectively couples respective stator supply lines 15a to rotor supply lines 15b. The coupling may be intermittent, continuous, or selectively controlled by additional flow control elements in the rotor 26b, or stator 26a. Such flow control elements may permit independent control over each rotor-stator supply line coupling, or may be constrained in that connecting or disconnecting one coupling disconnects or connects one or more other couplings. Herein the rotor 26b is taken to be a flow control device if it is adapted to provide switching between the couplings, or has embedded valves for controlling pressure on rotor supply lines 15b.

FIG. 11 is a schematic illustration of a chip controller 10 of simplified design useful in a valving method in accordance with an embodiment of the invention. The valving method involves a flow control device, such as a valve 18 on the chip controller 10. The flow control device is in a supply line 15 between a vent 14, which is open to ambient. The chip controller 10 rotates with the centrifuge. The supply line 15 is connected to a port 16 of the chip 25, and is thereby in fluid communication with a reservoir 40a, and, via a connecting microfluidic channel, to a reservoir 40b. The reservoir 40b initially contains a liquid 42, which is subject to a centrifugal force in the direction of the arrow. The reservoir 40b is vented by a second port 16 that is open to ambient. While two reservoirs 40b are shown, the liquid can be deposited into any number of suitably vented reservoirs.

An air plug 44 is naturally produced between the liquid 42 and the valve 18. As will be evident to those of ordinary skill, under the action of the centrifuge, the fluid will start to descend the channel towards reservoir 40b, but will only go until a balance of pressure caused by a limited expansion of the air plug 44, and the centripetal force, is reached. Opening the valve 18 to ambient pressure, will allow controlled release of the liquid 42 whenever it is desired, to within the limits of control over the valve 18. The opening of the valve 18 to ambient, or greater, removes the air plug 44 allowing the centrifugal force to draw the liquid into reservoir 40b, with suitable venting to the ambience provided by vent 16. Furthermore, with suitable centrifugation rates, and a suitable negative pressure applied at chamber 14, it is possible to introduce bubble mixing in the chamber 40a, as described below.

Naturally, the vent 16 of chamber 40b and port of chamber 40a have duality. A positive pressure at the vent is equivalent to a negative pressure at the port, and accordingly all of the processes described can be implemented by alternating couplings to the supply lines and ambient, and reversing the pressurization relative to ambient, and further advantages may be provided by coupling both the port and vent to respective, independently controlled (or oppositely pressurized) channels.

Two state electro-mechanical valves can therefore be used to directly block or open the access ports (vents) of chips. It is possible to create interesting fluidic functions by switching, in real-time, which chambers of the microfluidic devices are vented and which are blocked, without even using a pressure pump, or pre-pressurized chamber. The electrical power required to operate the valves, the microcontroller, and any communications functions, may be much less than the pump, making mounted power supplies more cost effective. An array of two state electro-mechanical valves mounted as shown in FIG. 11 may control a plurality of fluid supply chambers.

EXAMPLES

A microfluidic chip controller with a pneumatic control system was produced and tested. FIG. 11a is an image of two microfluidic chip controllers, with two microfluidic chips, mounted to a centrifuge. Only one of the chip controllers is in use, and is coupled electronically and pneumatically to both the chips. The design of the chip controller was optimized to ensure reliable operation of critical active components (i.e., pumps and electromechanical valves) despite the presence of high centrifugal accelerations that can easily exceed 100 times the gravitational acceleration on Earth. The pneumatic connections to the microfluidic devices are made with a manifold placed 5 cm away from the centre of rotation. A slip-ring with 10 independent electrical connections (EC3848; Moog, Inc., East Aurora, N.Y.) was used to power the platform during the rotation and transfer USB communications between an external computer and an on-board Arduino microcontroller. The microcontroller was used for the electronic control of 16 ultraminiature latching solenoid valves (LFLX0510200B Series 120 microvalves; The Lee Company, Westbrook, Conn.), the pump (P200-GAS-5V; Xavitech, Härnösand, Sweden) and a pressure sensor (HDIB002G from Sensor Technics). The microcontroller can also modify the speed of the pump to adjust the pressure between 0 to 5 psi above atmospheric pressure. All of the active components were found to be operational up to a rotation speed of about 1200 rpm, at which point the pump was found to slow down gradually. Although a platform operating at higher rotation speed could be easily designed (e.g., using an external pumping system combined with a pneumatic slip ring), but Applicant has found that all of the fluidic functions desired for development of bioanalytical assays can be performed reliably at rotation speeds of 1000 rpm or less.

FIG. 11b is an enlarged image of one chip controller. The chip controller is assembled on a custom-made printed circuit board (PCB) having dimensions: 5×2.5. The PCB interconnects the microcontroller (Arduino Micro board specifically equipped with an ATmega32u4 microcontroller), the pump, a decoder circuit, the pressure sensor, and the 8 pressure ports, each having a pair of supply lines attached thereto. The pump was adapted to maintain a pressure in the chamber of −3 psi to +7 psi compared to gage atmospheric pressure. Each port has two valves connected in series, the valves having a dimension of 3×10 mm, and had a switching time of less than 1 ms, and a power consumption of less than 2 mJ per switch. FIG. 11b shows the paired supply lines (tubes) for connecting to the chips: the paired tubes crisscrossing each other to go to identical chips located in opposite directions to permit duplication of testing on two different chips at the same time.

The 16 valves that were used in this controller can each leak up to 1 sccm of air at 5 psi of pressure in the closed state according to the manufacturer. This leakage was found to be problematic for the control of microliter quantities of fluid placed in the microfluidic devices. Those valves were nevertheless selected as their small size helps decreasing the total footprint of the controller. To minimize the effect of leakage, each port was connected to two valves as follows: an inlet of a first valve is connected to the pump, an inlet of the second valve is connected to atmospheric pressure, and outlets of the two valves are connected together to the supply lines using a T-junction. Each port can therefore be either pressurized (by opening the valve connected to the pump and closing the valve connected to atmospheric pressure) or connected to atmospheric pressure (by closing the valve connected to the pump and opening the valve connected to atmospheric pressure). In this configuration, the leakage from the valve is not a problem. Indeed, when the pneumatic line is connected to atmospheric pressure, the air leaking through the closed valve connected to the pump can escape through the opened valves connected to atmospheric pressure rather than through the microfluidic device. Alternatively, when the pneumatic line is pressurized, the pump can provide enough flow of air through the opened valve so that the air leaking through the closed valve connected to atmospheric pressure is insignificant. For this configuration of the controller, states where the two valves of a pressure line are opened or closed simultaneously were not used.

Applicant notes that if a closed state is desired for an application, successful chip controllers have been designed using valves known as LHLA0542311H, The Lee Company, Westbrook, Conn.

Durations of pressure pulses were controlled to ±3 ms using the LFLX0510200B Series 120 microvalves. The supply lines are plastic tubing. Coupling from the chamber (which can be taken to be a supply tube running from the pump) pressurized by the pump, in response to the sensor readings, is not in view, as it lies beneath the microfluidic chip controller. Real-time pressure measurement and control was exerted over the chamber. The chamber had substantially rigid walls for the volume and pressure used. As can be seen in FIG. 11a, the multi-channel electrical slip ring (a high-speed slip-ring) is used to supply power to the pump, microcontroller, and sensor. The chips were constructed as per Applicant's co-pending patent application U.S. Ser. No. 12/588,236.

Control software was produced that allowed for independent activation or pulse generation for the 8 ports; pressure pulse duration control to ±3 ms; and real-time pressure measurement and control; and accordingly, the software was enabled to execute complex sequences.

Subsequently the system was modified to provide an extension connector for the temperature control of a polymerase chain reaction (PCR) module using a single microcontroller. Specifically two temperature control areas were independently controllable on both chips, with real-time control provided by a purpose built computer software that gives access to a second Arduino microcontroller responsible for the temperature controls in each region. The second Arduino microcontroller was used to control four 2×2 cm² thermoelectric elements and measure the temperature in real-time using four thermocouples. The 16 valves in this embodiment were series 120 valves from the same source.

Later developed prototypes integrated access ports for coupling of the chip having a standard manifold, to the chip controller at the chip-holding mechanism, to expedite connections and avoid any errors with incorrect connections of tubes that was possible in the previous embodiments.

Applicant notes that one of the advantages of using a pneumatically controlled centrifugal chip is the relaxation of constraints on the design, and on fabrication tolerances, of the chips themselves. Microfluidic functions become independent of the dimensions of the communicating channels and related features at the chip level. They are more robustly controlled by varying a difference in pressures between two ends of a microfluidic channel than by fine control over hydrodynamic resistances, and radii of the channel at various locations. Consequently, large scale fabrication processes including injection molding, thermoforming or roll-to-roll hot embossing can be used to produce the chips, which may effectively be designed to be soiled and discarded as single-use devices. Microfluidic chips can thus be fabricated in a material that is suited best for a particular assay while also being compatible with technical and economic requirements related to the production process.

Figure 12C:
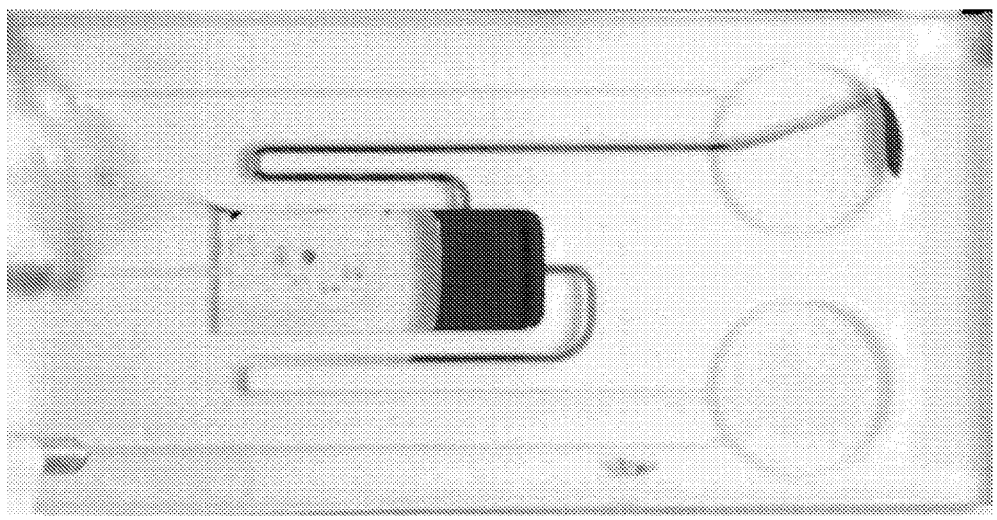
FIGS. 12a-c are images of chips undergoing processes that can only be effectively provided using centrifugal microfluidics: respectively pneumatic valving, reverse pumping, and pneumatic switching.
Figure 12B:
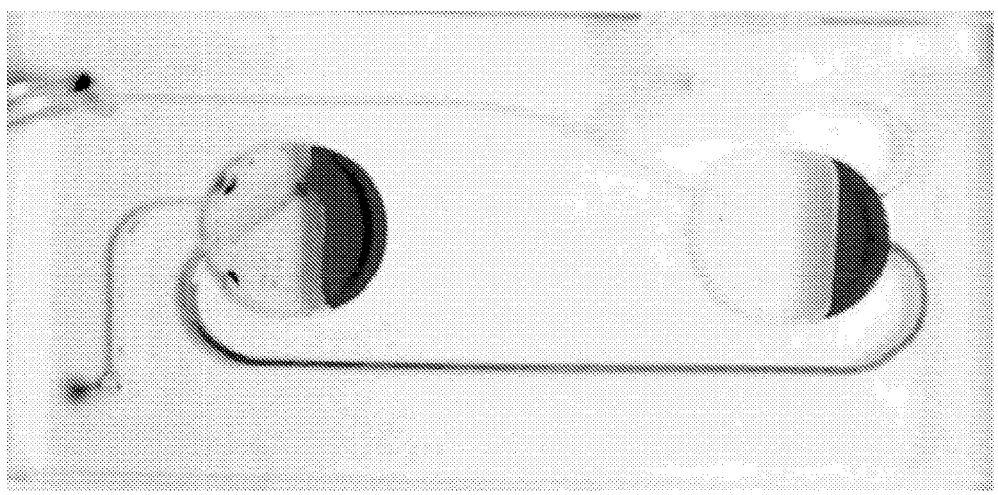
Figure 12A:
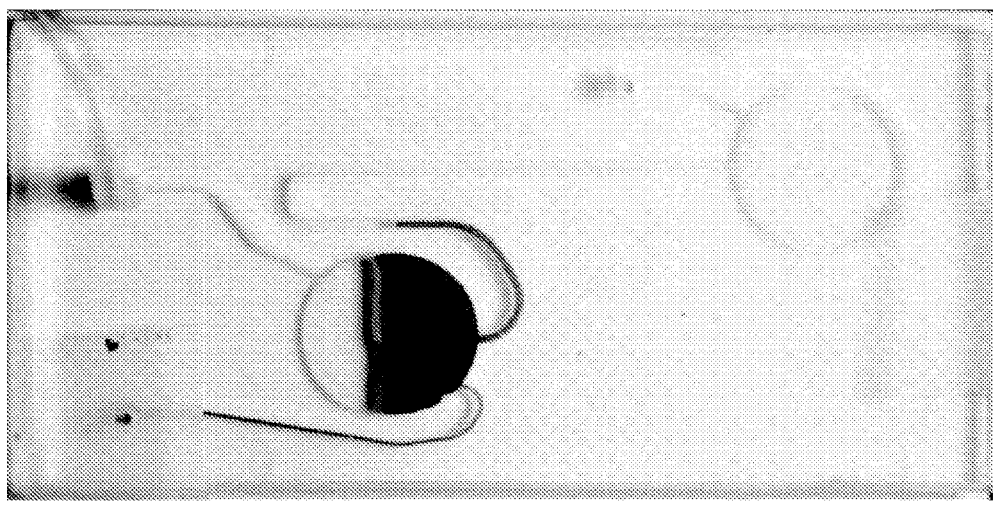

FIG. 12 shows a graph showing liquid displacements (measured and predicted) at different centrifuge rotation speeds (rpm) and applied pneumatic pressures (psi above ambient). The predicted displacement is provided by the following model: if a liquid plug is connected to two ports of pressures $p_1$ and $p_2$, then the equation for the steady state flow in a centrifugal force field (neglecting capillary forces) can be written as:

$$p_1 - p_2 + \tfrac{1}{2}\rho\omega^2(r_2^2 - r_1^2) = R_{hyd}Q$$

where $\rho$ is the density of the liquid, $\omega$ is the angular velocity of the spinning platform, $r_1$ and $r_2$ are the positions of receding and advancing menisci, respectively, $R_{hyd}$ the hydraulic resistance of the fluidic path, and Q the flow rate of the liquid. It will be noted that there is very good agreement between the equation and observed displacements. FIGS. 12a-c show images of three microfluidic chips that demonstrate three procedures that can be performed using centrifugal and pneumatic control with the knowledge. These are not intended as complete chips, but simply demonstrate one capability of suitably designed chips. Note the images were taken with the chip having a rotation speed of 600 rpm (to derive an acceleration of about 50 g (about 500 m/s²)), with an applied pressure of 1.5 psi, and a pulse duration of 100 ms. The acceleration vector arising from centrifugation points to the bottom of the figure.

FIG. 12a shows a chamber that is filled with tinted water. The over-all pattern on the chip is a standard siphon valve, with a starting chamber, a bottom-fed serpentine channel extending from the starting chamber to a crest higher than the chamber, and an outlet that leads to a bottom reservoir.

Two things are different about this chip than the standard siphon valves: 1) that the serpentine channel is not treated to encourage capillarity, and so fluid in this chamber will never rise above the stable state shown in FIG. 12a; and 2) the presence of a single pneumatic line that is coupled to a top end of the starting chamber. Operation of this valve is provided by applying a positive pressure at the port, until the siphon valve is primed. Once primed the pressure can be released, and the liquid will exit the starting chamber. Naturally, instead of pushing, this pneumatic line can apply a negative pressure, coupled to the bottom reservoir, in which case the fluid is pulled. Thus the fluid is stably held in the starting chamber, regardless of centrifugation, until pressure is supplied. Thus pneumatic actuation is provided.

FIG. 12a shows a separate loading conduit to the starting chamber (which is plugged throughout the process). In another embodiment, the same chamber for loading is used for the pneumatic line. In that case, once the fluid is loaded and the pneumatic line is coupled, an air plug is naturally formed above the starting chamber. The air plug will expand under the centrifugation pressure, which can lead to a priming of the siphon (i.e. filling of the serpentine channel), but the chamber will be unable to release the fluid because the rarified air plug will only expand so far. Thus as soon as the pneumatic line is released, the air plug will cease, and the starting chamber will discharge. Naturally it is important to limit a volume of the space between the fluid and the valve to achieve this action.

FIG. 12b shows what we call reverse flow pumping. Two chambers are shown one referred to as the top chamber, the other referred to as a bottom chamber. Tinted fluid is loaded into the bottom chamber by a port (to the right) that is blocked after fluid loading. A pneumatic line is coupled to a top of the bottom chamber. By application of a positive pressure by the pneumatic line, the fluid, which cannot retract through the loading path, is forced down through a bottom exit that communicates with a top of the top chamber. FIG. 12b shows the flow reversal in operation. Generally a greater pressure is required for pumping after the priming of the channel between the two chambers. The top chamber is vented to prevent an air plug resistance to the reverse flow. Again a negative pressure at the top chamber vent can equivalently be used. It will be appreciated that providing a pneumatic line to the top chamber that can be pressurized or opened to ambient pressure, can be valuable, as opening the top chamber to ambience is useful for reverse pumping, and once the top chamber is loaded, it can be switched to a positive pressure, for a subsequent pneumatic valving, or other operation. The fact that the flow through a microfluidic channel can be reversed (pumping liquids back toward the centre of rotation) in a controlled manner offers the advantage of managing efficiently the footprint of the device, providing the opportunity to integrate more functions in a compact format and leading to both miniaturization and a significant reduction in cost per assay.

FIG. 12c shows a chip suitable for pneumatic switching and metering, having a loaded starting chamber (rectangular, center) and two circular receive chambers. The switching can be provided by two pneumatic lines to each of the receive chambers, and a vent at the starting chamber, or with pneumatic lines to all 3 chambers. The volume in the starting chamber may not be exact. As it is generally difficult to exactly load a prescribed volume into a chamber, protocols requiring accurate control of volumes of reactants need special attention. It will be noted that the channels between the two receive chambers have different positions on the starting chamber. Specifically a right receive chamber is connected on a side of the starting chamber, at a fixed elevation, and the left receive chamber is connected to a bottom of the starting chamber. By applying a equal pressures at the left receive chamber and starting chamber, that is greater than a pressure at the right receive chamber, fluid in the starting chamber above the fixed elevation is siphoned off, and loaded into the right receive chamber. In fact, the pressure difference needs only be applied during a priming of the crest. Once the crest is primed, the starting chamber will be emptied to a specified degree under the centrifugal pressure alone. The fixed elevation automatically results in no further action once the fluid level in the starting chamber meets the fixed elevation. The remainder of the fluid in the starting chamber is a prescribed volume, regardless of the amount of fluid initially in the starting chamber (as long as it was initially filled above the fixed elevation). Then, when desired, a pressure imbalance is applied between the left receive chamber and the starting chamber, to prime the metered volume of liquid the serpentine path to the left receive chamber. Once primed, the pressure difference can be removed, and the precisely metered volume is delivered to the left receive chamber.

Figure 13:
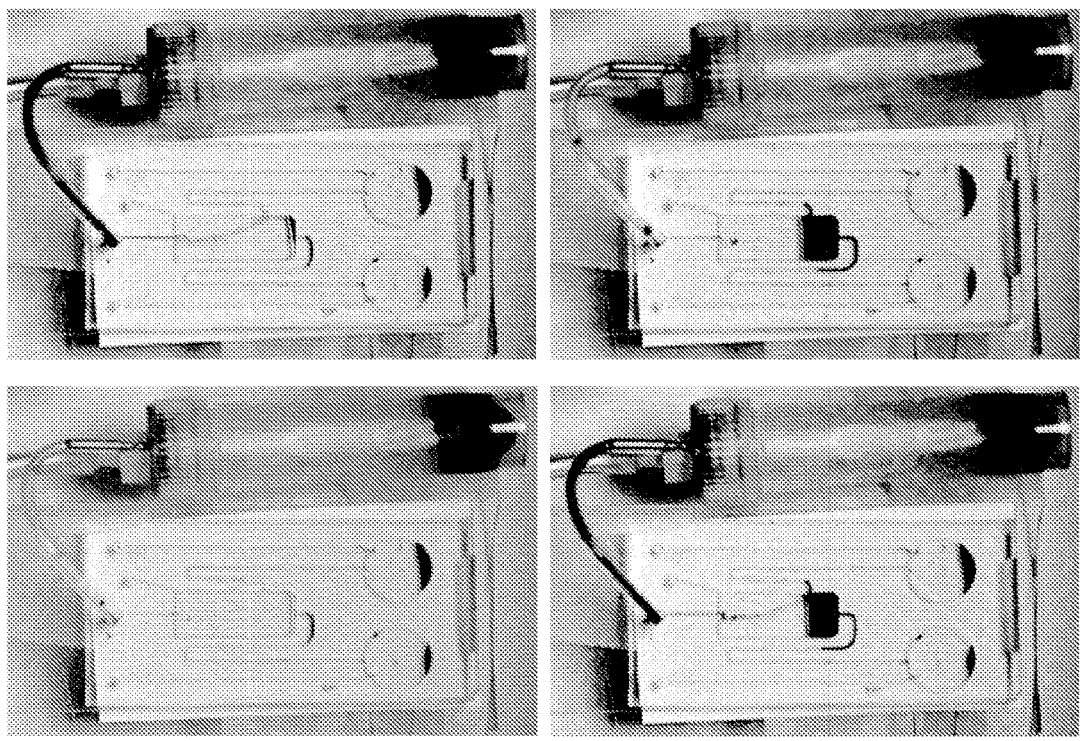
FIG. 13 is a panel of 4 images of a chip undergoing off-chip loading.

FIG. 13 is a panel showing 4 images taken during a demonstration of off-chip loading. Rotation speed was 600 rpm for an acceleration of about 50 g (about 500 m/s$^2$); pressure was applied at 2.9 psi for a pulse duration of 2 s.

A vial with tinted water is provided with a fluid path (in the form of a tube no different than the pneumatic paths in the current embodiment). The fluid path connects to a port of the chip shown in FIG. 12c, but to which no pneumatic lines are attached. The vial and chip are mounted to a centrifuge. Some tinted fluid was left in the chip to facilitate viewing of the channels and chambers. By applying a positive pressure to the vial above the tinted water, the tinted water rises through the fluid path and is injected into the port. The air previously contained in the starting chamber is displaced out the chip through one of the 3 vents open to atmospheric pressure. After removing the applied pressure within the vial, the centrifugal force pushes the liquid contained in fluid path back into the vial.

Thus the invention also provides a method for loading a quantity of liquid into a microfluidic device from external containers without manual intervention. Such external containers would typically have a large volume compared to that of the microfluidic reservoir, thus enabling automatic filling of various liquid buffers in the devices for multiple sequential tests, minimizing the manual interventions that are typically required to enable sequential tests. Filling from an external reservoir permits us to perform assays requiring volumes that are too large to fit in the microfluidic device at once. In this case, an external waste container could also be implemented, or if non-toxic, the waste material may be ejected.

A volume of tinted water transferred can be controlled by changing many parameters, including: pressure pulse duration, pressure applied, rotation speed and centrifugal force, liquid viscosity, liquid density, tubing size and length, channel size and length, and a volume of compressible fluid in the vial.

It should be noted that the level of the meniscus of the vial is substantially lower than the chamber into which the tinted water is loaded. Thus, this loading process is analogous to the action of reverse pumping against centrifugal action that was described previously. This is not necessary, but if the meniscus is above the chamber, it will flow into the chamber unless blocked, for example by an air plug as described above, or by an extension chamber, known in the art, to at least temporarily to block the siphon effect, or by a positive pressure on the chip, or by a constriction above the meniscus that precludes a continuous liquid channel forming under the centrifugal force.

Figure 14:
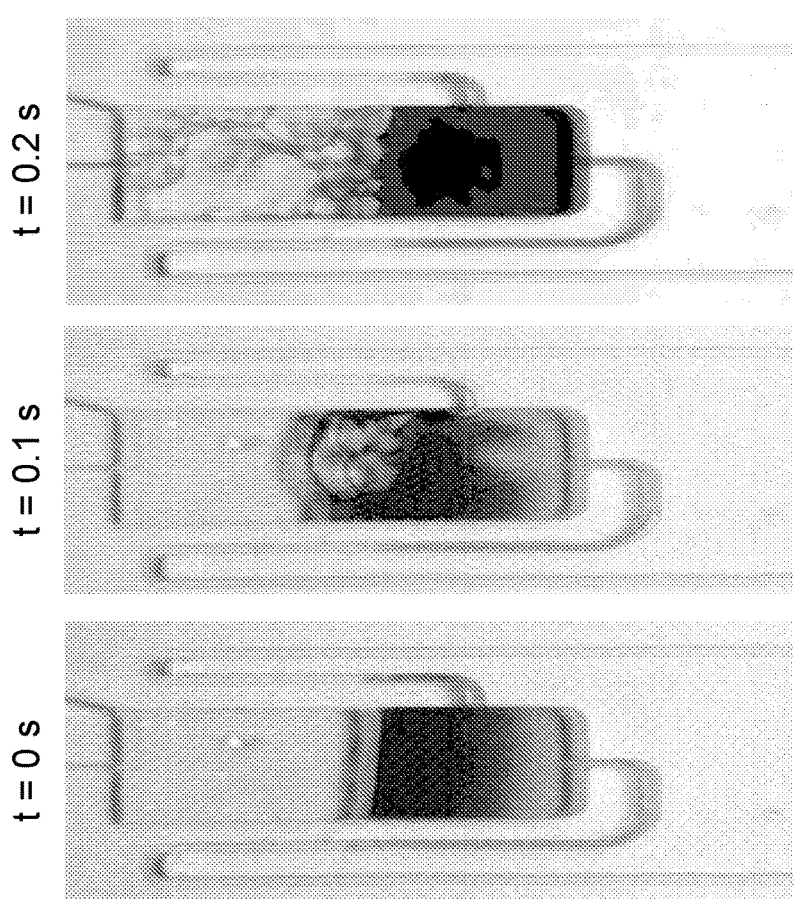
FIG. 14 is a panel of 3 images of a chip undergoing bubble mixing.

FIG. 14 is a panel showing 3 images of the chip shown in FIG. 12c, which undergoes bubble mixing. As is well known in the art, mixing tiny volumes of liquids in microfluidic chips is a formidable challenge. While Applicant has discovered an excellent technique for mixing fluids in this environment, the method requires two streams of droplets to be introduced into a chamber at a same time (see WO2013/0120190). The use of pneumatic pressure can expedite mixing, and allow for mixing without moving the mixed fluids to move into another chamber. The first panel shows two differently tinted water samples in the starting chamber. By application of positive pressure at a side channel, bubbles can be introduced into the chamber to promote mixing.

While the formation and rising of gas bubbles against gravity is easily observed in the macroscopic world, this phenomenon is typically not possible in microfluidic devices and capillary tubes due to their small dimensions. Indeed, in microfluidic devices or capillary tubes, it is well known that the introduction of a gas against gravity would typically push the liquid upward until the liquid is forced out of the device rather than creating bubbles (a fact that makes the chip controller useful in other modes of operation). Thus, in previous microfluidic devices or small capillary tubes, the introduction of a gas against gravity could not be used for mixing, as it does not typically lead to the formation of fragmented gas bubbles and associated fluid recirculation. This arises from the interaction of the gas bubbles with the solid walls of the devices, which imposes a minimum bubble size before it can rise. If this minimum bubble size is larger than the chamber or channel size, liquid is expelled out of the device when gas is introduced at the bottom of the chamber. Conversely, if this minimum bubble size is smaller than the chamber or channel size, it will rise before reaching the chamber size, which will provide a path for the liquid to flow back to the bottom of the chamber. In other words, to achieve bubble-based mixing in microfluidics, the relative importance of buoyancy and surface tension must be such that the introduction of gas against the acceleration field leads to the transport of the gas through the liquid layer without pushing the liquid out of the device.

We have done modeling work to evaluate the conditions under which bubble mixing can occur in microfluidics. We considered that bubbles would rise spontaneously if the buoyancy force is stronger than the contact angle friction force caused by the interaction of the liquid with the sidewalls of the channel. We also considered that the bubble can rise without dragging the liquid out of the microfluidic channel if the bubble size is smaller than the channel size. From these assumptions, it is possible to predict the acceleration, channel size, liquid density, surface tension and contact angles for which bubble mixing is possible. While the exact values depend on the geometry of the experiment, and specifics of the liquid, we found that the following general relation can be used as an approximation to predict the conditions under which bubble mixing is possible. We found that bubble mixing is possible if:

$$\frac{F_B}{F_S} \approx \frac{a\rho H^2}{\gamma(\cos\theta_r - \cos\theta_a)} > 1$$

where, $F_B$ is the buoyancy force, $F_S$ the contact angle friction force, a is the acceleration, $\rho$ the liquid density, H the channel size, $\gamma$ the liquid-gas surface tension and $\theta_a$ and $\theta_r$ are respectively the advancing and receding contact angles of the liquid on the channel wall. This condition is very similar to the Bond number (or Eötvös number), describing the relative importance of buoyancy and surface tension. The equation shown here represents a simplified condition so that a bubble start rising by buoyancy before getting large enough to touch the top of a microfluidic channel. For a wide and shallow reservoir, this condition is not very accurate. For such geometries, a different equation can be used heuristically, by considering a bubble touching the top and bottom of the chamber. In this case, bubble mixing is possible if the bubble is narrower than the width of the chamber when it rises by buoyancy. Furthermore, the equations in either case are strictly speaking valid only for a slowly moving bubble. In the observed case, air bubbles are moving very fast and we cannot neglect many other effects.

For example, taking a typical contact angle hysteresis (i.e., $\theta_a$-$\theta_r$) for water on polymer to be about 30° and an advancing contact angle of 120°, water surface tension of 0.07 N/m and water density of 1000 kg/m$^3$, under normal gravitation (i.e., a is approximately 9.8 m/s$^2$), the minimum channel size H that can satisfy this equation is about 2 mm. But in a centrifuge rotating at a typical speed of 1000 rpm, an acceleration of about 1100 m/s$^2$ is obtained (a=$\omega$R$^2$, where w is the angular speed and R~0.1 m the distance to the center of rotation), the minimum channel size H that can satisfy this equation becomes 180 microns, which is smaller than a typical chamber height in centrifugal microfluidics. These results explains why microfluidic bubble-based was not possible using previous microfluidic controllers known in the art and why microfluidic bubble-based mixing can only occur by combining centrifugal and pneumatic forces.

It is noteworthy that it would be impractical to control the other parameters of the equation shown above (such as surface tension, contact angles or fluid density difference) to achieve bubble-based mixing in microfluidics without centrifugation. Indeed, in most cases, the liquid parameters are set by the assays requirements (biological, etc.). In general, acceleration is thus the only parameter that can be changed to achieve bubble-based mixing in microfluidics.

The pressure required to form bubbles can be estimated by the pressure required to push the initial liquid column and the Laplace pressure that permits the expansion of the bubbles against surface tension. It can be easily verified that, under typical working conditions of centrifugal microfluidics, these two conditions are easily fulfilled with relatively low pressures. These pressures are easily obtained with miniature pumping systems available commercially.

Experimentally observed: After about 18 s of centrifugation, a quick 100 ms air pulse is applied on the pneumatic lines via the receive chambers, to create bubbles in the starting chamber and mix the two liquids. The capability to apply pressure pulses while the chip is in rotation ensures that the liquid remains inside the microfluidic chamber despite the air flowing from the inlet 1 and 3 (due to the strong acceleration). FIG. 14 shows a first image with no mixing, a second with bubbles introduced, and a third where the bubbles are essentially leaving the mixed fluid.

Further note, essentially the same bubbling technique can be used, not to mix two liquids, nor to homogenize or suspend phases that are prone to settling, but to supply a reactant, or control a temperature within a reaction chamber.

A type and amount of gas dissolved in a liquid in a chamber of a chip can be controlled by forcing the formation of gas bubbles at the bottom of such reservoir using the microfluidic controller disclosed in the present invention. Flow control devices are used to control the flow of the various pressurized gas type so as to create gas bubbles at the bottom of the microfluidic reservoir. The partial dissolution of the gas bubbles into the liquid can be used to control the amount and type of gas dissolved in the liquid. For example, this is of interest for applications involving live organisms (cells, bacteria, C. elegans worms, tissues, organs on a chip, etc.), where the gas content (oxygen, CO2, nitrogen, etc.) of the liquid can influence the growth of the organisms. Additionally, the bubbles can create fluid recirculation and mixing to ensure uniform fluidic condition for the live organisms.

It should also be understood that more complex systems based on that shown in FIG. 14 could be implemented. For example, other fluid reservoirs could be integrated in the microfluidic device or in external containers to supplement the live organisms with different fluids. A waste port could also be integrated in reservoir to evacuate excess liquid. For example, centrifugation at higher rotation speed could be used to sediment the organisms before excess liquid is removed by using a channel placed on the side of reservoir. This would provide a way to remove wastes generated by the organisms, supply nutrients and change the fluid environment. Also, a negative pressure connected to another flow control device could also be used to degas the liquid in the microfluidic chamber.

Figure 15:
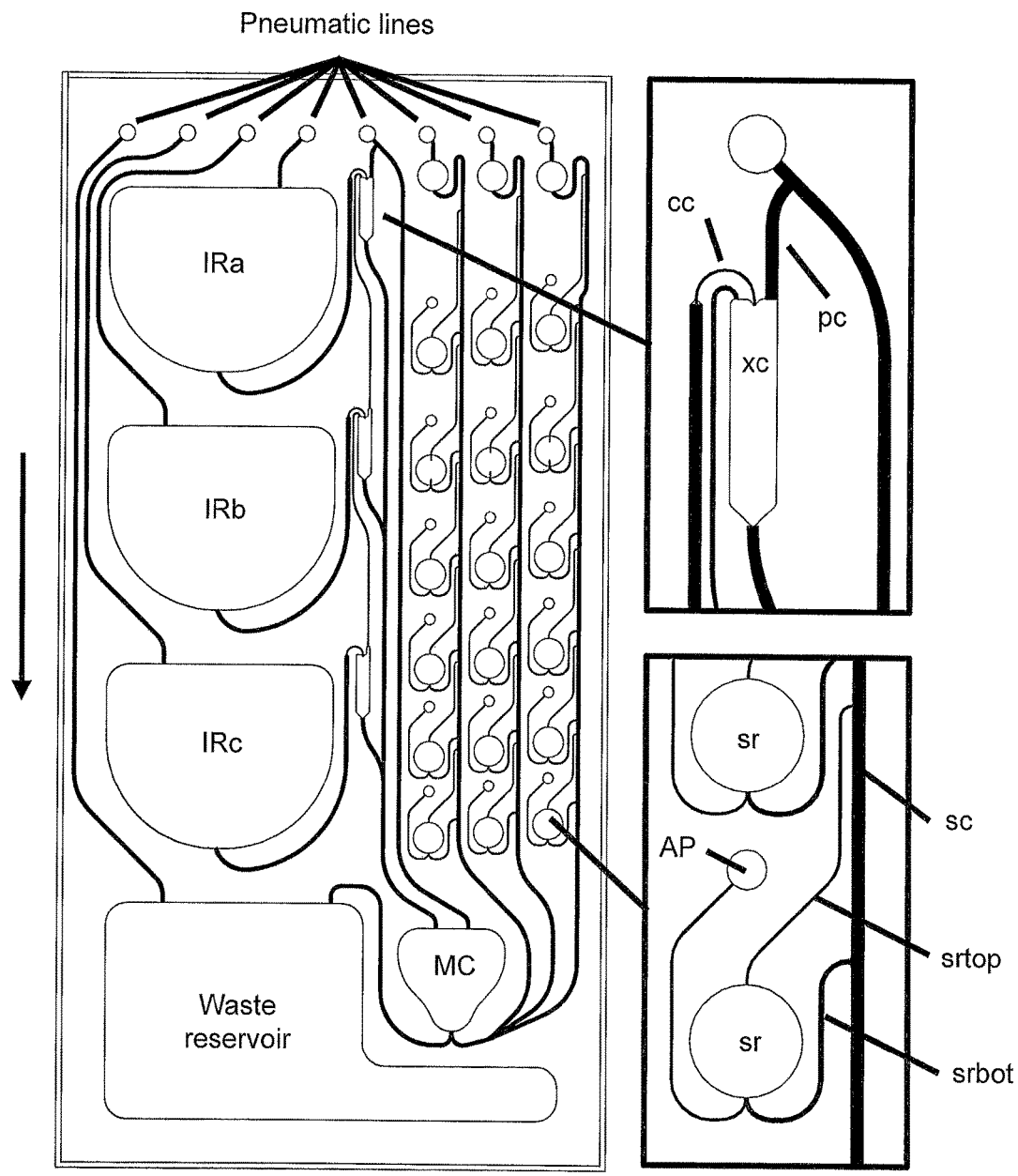
FIG. 15 is a schematic illustration of a chip designed for mixing and aliquoting.

FIG. 15 schematically illustrates a chip that can be used to generate liquid mixtures of any amounts of up to three liquids and store up to 18 independent mixtures for subsequent analysis by using a controller in accordance with the present invention having 8 pneumatic lines. This example simultaneously demonstrates two functions (namely: generation of mixtures and their separating and aliquoting) that are typically very difficult to achieve using prior art microfluidic control. Fabrication and testing of this design is forthcoming.

The microfluidic input reservoirs (IRa,b,c) are first filled with the distinct initial liquids used for the assay. Pneumatic lines are coupled to the chip controller, for independent actuation. Rotation speed of the microfluidic unit is then increased to about 600 rpm or more to provide a centrifugal force, in the direction shown by the arrow, typical of centrifugal microfluidics. In general to generate a mixture, pneumatic lines to tops of respective input reservoirs are given positive pressure, to push the liquid into its extension chamber (xc) through the small constriction channel (cc) (see top right enlargement). The function of cc is to control the flow rate of the pressurized liquid to enable precise volume transfer from the IR to the xc, as slow metering, drop by drop, allows for better control with the duration or frequency of the pressure pulses. The volume of liquid transferred can be controlled by changing many parameters, including: pressure pulse duration, pressure applied, rotation speed and centrifugal force, liquid viscosity, liquid density, constriction channel size and length, volume of compressible fluid in the input reservoir, etc. Preferred methods include pressure pulse duration, pressure applied and centrifugal force as these can be easily changed on the fly by controller disclosed in the present invention. The xc is connected to a pneumatic line connected to atmospheric pressure through pneumatic channel (pc). This connection provides the air intake required to allow the liquid dispensed through the cc to flow down to the mixing chamber (Mc) by the centrifugal force. This dispensing step can then be repeated for one or more input reservoirs to dispense a controlled volume of different liquids to MC. The loading to the MC may be serial or in parallel. If in parallel, mixing may be inherently provided as per the teaching of Applicant's co-pending W02013/0120190.

Additionally, or alternatively, the content of the mixing reservoir may be mixed by generating air bubbles at the bottom of MC. This is achieved by applying air pulses to the three right most pneumatic lines and waste reservoir.

After mixing, all the pneumatic lines are pressurized except for one of the three right most port (or a negative pressure is applied to that one port). The pressure pushes the liquid contained in the mixing reservoir into a corresponding one of three storage channels (sc) connected to storage reservoirs (sr). The pressure applied and rotation speed are controlled to control the height at which the liquid can rise in sc according to this equation:

$$P=\tfrac{1}{2}\omega^2\rho(r_1^2-r_2^2)$$

where $\omega$ is the angular velocity, $\rho$ the liquid density, and $r_1$, $r_2$ are the distances between the liquid front and center of rotation on top and bottom of the reservoir respectively.

Each sr is filled by the rise of the liquid in sc between connection points of channels srtop and srbot. Once a given sr is filled, the pressure is released and the liquid remaining in sc flows back to the MC by centrifugal force. The liquid left in the Mc may then be supplied additional quantities of one or more of the liquids in the IRs, for example to analyze the same reaction at different concentrations of specific reactants. However, the addition of liquid from the IRs may not be mixed with the remaining liquid, unless bubble mixing is performed. If the remaining liquid is not desired for the remaining aliquots, it may be transferred to the waste reservoir by applying pressure to the appropriate access ports. This may be performed by flushing the MC with liquid from one of the IRs, to cleanse the MC, for example.

The entire process can then be repeated to fill a new sr with a different liquid mixture. It is important to note that very little mixing is expected to occur between the liquid already stored in the previously filled sr and the new liquid mix carried through sc to fill a next empty sr. Indeed, as the liquid is raised in sc to reach the next sr, the liquid may block both the srtop and srbot of the filled sr to sc. As the air cannot escape when both connection points are blocked, the new liquid mix in sc cannot enter in the already filled sr. The access ports (AP) of the each sr are blocked during the operation of the device. However, once all the desired storage reservoirs are filled, the rotation may be stopped and the APs are opened and can be used to independently recover the liquid stored in each storage reservoir.

Figure 16:
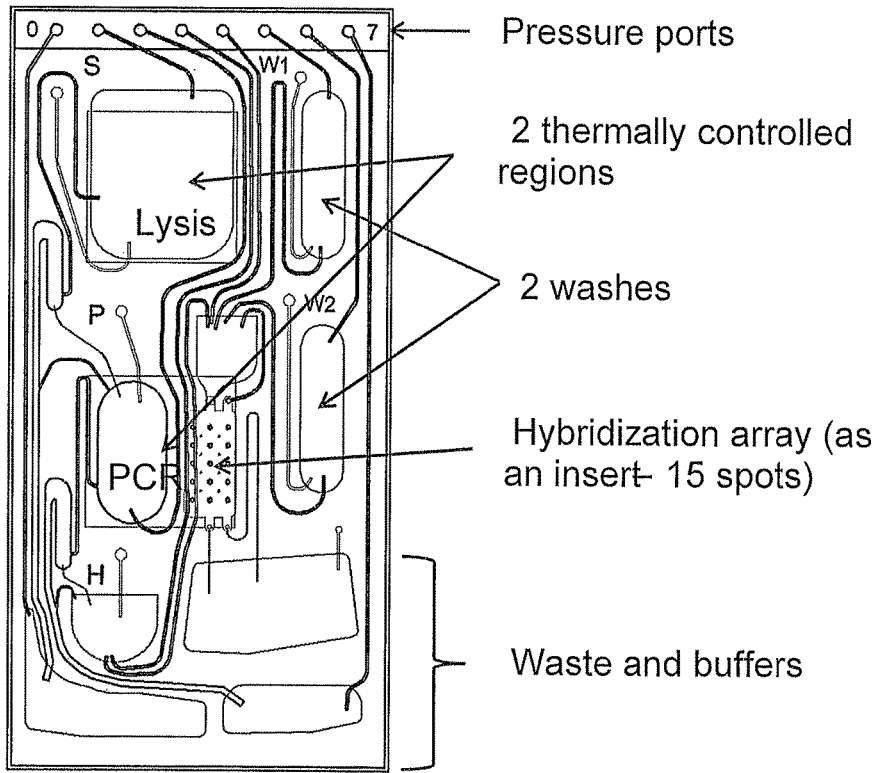
FIG. 16 is a schematic illustration of a chip designed for lysis, PCR and hybridization.

FIG. 16 schematically illustrates a design for a chip for Lysis, PCR and hybridization. By design, a sample (200 µL) is thermally lysed, then 5 µL transferred and "bubble" mixed with the PCR mix into the PCR chamber. PCR amplification follows, then 5 µL are transferred to the hybridization buffer chamber (H), "bubble" mixed with the buffer then transferred to the array for hybridization. Then two washes (W1 and W2) are performed prior to the actual final detection step. Two independently controlled heating elements are provided in contact with the lysis chamber, and PCR chamber and hybridization array. This is preferably controlled by the microfluidic chip controller. Testing of this device has been accomplished, and was a success.

Figure 17:
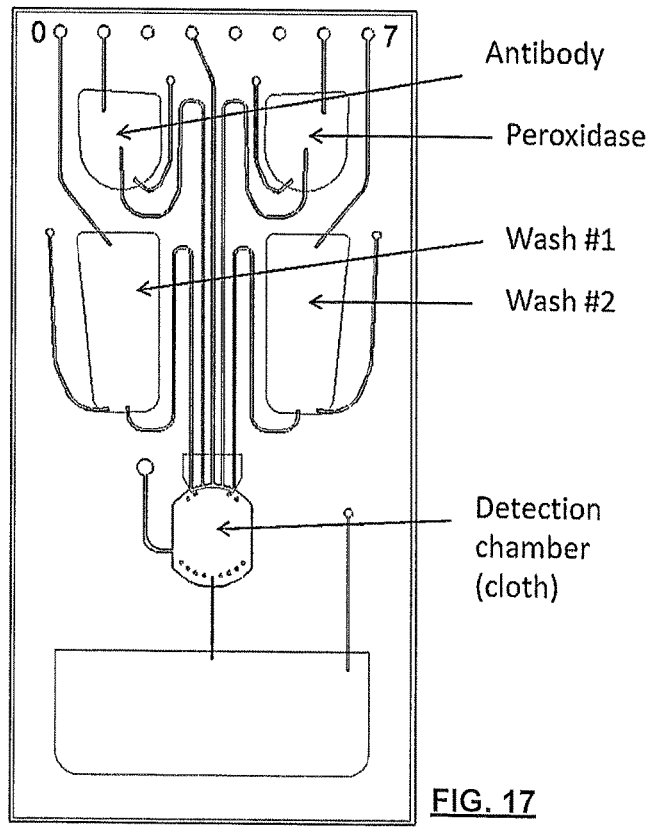
FIG. 17 is a schematic illustration of a chip designed for sample to answer system based on a detection cloth.

FIG. 17 is shows a design for a sample to answer system based on a detection cloth. By design, antibody, peroxidase and two wash solutions are loaded into their respective chambers, and the detection cloth array is installed in the chamber. A sample is loaded to detection chamber, and the chip incubated at 80° C. for 15 min. Rotation is started. Sample flows to a waste reservoir at the bottom of the chip, until detection cloth is nearly completely dried. Wash liquid is delivered into the detection chamber, and flushed to the waste reservoir. When the detection reservoir is empty and the cloth is dried, antibody solution is delivered, and rotation is stopped for 10 min for incubation. Platform is spun again and, when detection reservoir is empty and cloth is dried, second wash is transferred to the detection chamber. Then peroxidase is transferred to the detection chamber. Chamber 13 is then optically scanned and detection spots monitored with appropriate camera and computer software. Testing of this device has been accomplished, and was a success.

Other chips have been designed with this controller in mind, such as a DNA extraction and concentration protocol. The fabrication and testing of this design is forthcoming. This chip would be preloaded with capture beads (e.g. prior to sealing). 0.5 mL of DNA sample, wash and buffer liquids are injected trough respective ports into respective chambers. Sample is moved by centrifugation or pneumatic valving to a capture and release chamber having the beads at the bottom thereof, and then is passed through the beads and then to waste. The beads are then washed, and then the wash is sent to waste. Buffer is sent to the bead bed, and the bead bed is heated to 85° C. for 2 min. The buffer and content is moved to a collection chamber.

Finally, a RNA reactor microfluidic chip has been designed, and is expected to be produced and tested in the coming year, to perform a protocol consisting of viral lysis, sample clarification, protein removal, RNA capture and concentration, re-suspension, simultaneous labelled and unlabeled reverse-transcriptase PCR amplification, microarray hybridization, and sample preparation for sequencing. According to its design, sample clarification, lysis and protein removal involves loading a 400 µL sample in a reservoir preloaded with a lysis buffer and strong cationic exchanger beads of 5-10 µm diameter (e.g. Invitrogen, Dynabeads® SCX) for the protein capture. Rotation speed of the microfluidic unit is then increased to about 600 rpm or more to provide a centrifugal force typical of centrifugal microfluidics. Using a pneumatic line, air bubbles are then injected in the chamber, for mixing. The mixing action promotes chemical lysis of the targets and nonspecific attachment of the proteins to the surface of the SCX beads. The rotation speed is then increased to about 1000 rpm or more for 5 min leading to the clarification of the supernatant solution and the concentration of the cellular debris and protein loaded SCX beads to the bottom of the chamber.

Then RNA is captured and concentrated. The rotation speed is then reduced to about 600 rpm. By applying a pressure of about 20 kPa above atmospheric pressure to the chamber, a customizable volume of the cleaned RNA-rich supernatant is transferred to a second reservoir, which was preloaded with RNA capture beads. The supernatant and RNA capture beads are then mixed and incubated using air bubbles injected by pneumatic pulses at the bottom of the reservoir. After attachment of RNA to the capture beads, the liquid in the second reservoir is flushed to a waste reservoir through a filter. The filter pore sizes are selected to prevent the beads and attached RNA to leave reservoir.

By pressurizing a third reservoir, an elution buffer is then introduced into the second reservoir, releasing the RNA attached to the beads in a clean buffer following mixing. Purified RNA is then transferred to a reverse transcriptase reservoir maintained at a given temperature by a temperature cycling thermoelectric element that is operated and controlled while the chamber is under rotation. Next, an RNA denaturation buffer is introduced into the reverse transcriptase reservoir and mixed with the purified RNA. Following incubation at 65° C. and rapid cool down to 0° C., a C-DNA synthesis buffer located in another reservoir is transferred to the reverse transcriptase reservoir and mixed. Following incubation at 50° C. and thermal inactivation at 85° C., a C-DNA rich supernatant is isolated in the reverse transcriptase chamber by increasing the rotation speed to 1000 rpm or more for 5 min.

The C-DNA rich supernatant is pumped toward the center of rotation by applying pressures to a set of pneumatic lines. The liquid is divided into two top reservoirs to perform respectively labeled and unlabeled PCR amplifications. The labelled amplification is used for microarray hybridization while the unlabeled DNA is preferable for many types of external analysis, including DNA sequencing. Both top reservoirs are located above thermoelectric elements providing the potential for fast temperature cycling while the microfluidic devices are rotating. After PCR amplification, the DNA located in one of the top reservoirs is denaturized at 95° C. and transferred in the hybridization buffer of a final reservoir using a pressure pulse. After mixing the amplified [DNA and the hybridization buffer using pressure pulses, the sample is flowed above a microarray at a controlled speed. The microarray is rinsed by transferring the washing buffer of a reservoir.

The protocol described herein provides a means to achieve both on-chip sample to answer detection of viruses and unlabeled PCR amplification and sample preparation for external DNA sequencing.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A microfluidic chip controller comprising:
   a body having a coupling for mounting to a centrifuge while permitting concurrent mounting of a microfluidic chip to the centrifuge, so that the body and chip are rotatable by the centrifuge, the body having a first opening to a first pressurized fluid supply;
   a first pressurized fluid supply line having first and second ends, the first end for fluid communication with the first opening, and the second end adapted for fluid communication with a first port of the chip;
   a flow control device in the supply line, mounted to the body for selectively controlling a supplied pressure to the first port; and
   an electrical circuit for controlling the flow control device provided, with at least part of the electrical circuit mounted to the body,
   whereby the microfluidic chip controller mounted with the chip to the centrifuge, with the first supply line connected to the first port of the chip, allows for controlled delivery of pressurized fluid into the chip during centrifugation.

2. The microfluidic chip controller of claim 1 further comprising a second pressurized fluid supply line communicating with a second pressurized fluid supply by a second opening in the body at a first end, the second supply line providing, at a second end, a coupling for sealed mounting to a second port of the chip.

3. The microfluidic chip controller of claim 2 wherein the first and second supplies are adapted to be independently maintained at different pressures.

4. The microfluidic chip controller of claim 1 wherein the coupling for mounting the control system to a centrifuge provides a mechanical attachment to a blade of a centrifuge at a position that does not interfere with a mounting position for the chip on the blade.

5. The microfluidic chip controller of claim 1 wherein the coupling for mounting the control system to a centrifuge provides a mechanical attachment to a chip mounted to a blade of a centrifuge.

6. The microfluidic chip controller of claim 1 further comprising a part of the body shaped for mounting or supporting at least a part of the chip.

7. The microfluidic chip controller of claim 1 wherein the coupling permits concurrent mounting of a plurality of chips to the centrifuge.

8. The microfluidic chip controller of claim 7 wherein the first supply line branches, to provide at the second end, a plurality of couplings for fluid connections to first ports respectively on each of the plurality of chips.

9. The microfluidic chip controller of claim 1 wherein the electrical circuit further comprises an electrical lead for coupling with an electrical component on, or adjacent, the chip, the electrical lead adapted to supply power to, or provide signaling to, the electrical component.

10. The microfluidic chip controller of claim 1 wherein the microfluidic chip controller further comprises a joint for mounting to the chip or a support for the chip.

11. The microfluidic chip controller of claim 10 wherein the microfluidic chip controller further comprises a mechanical actuator for controlling a motion of the chip in a plane of rotation of the centrifuge, the motion including at least a 5° rotation of the chip projected on the plane.

12. The microfluidic chip controller of claim 1 wherein the first pressurized fluid supply comprises one of the following: an enclosed pressurized chamber; a pressurized chamber in communication with a negative or a positive pressure source; a pump; a pump that is mounted to the chip controller; a pump that is mounted to the chip controller near a centre of rotation of the centrifuge to limit a moment on a blade of the centrifuge by which the chip controller is mounted ring; a pump that is controlled by the electrical circuit; a pump with a power supply mounted to the chip controller; a pump with a power supply provided off of the centrifuge, and is connected to the pump by an electrical contacting rotational coupling, such as a slip ring; and a pressurized chamber in communication with a negative or a positive pressure source via a pneumatic slip ring.

13. The microfluidic chip controller of claim 1 wherein the body comprises a rotor of a slip ring mounted for rotation with the centrifuge, wherein the chip controller further comprises a stator of the slip ring.

14. The microfluidic chip controller of claim 13 wherein: a plurality of pressurized fluid supply lines on the rotor are coupled to respective pressurized fluid supplies of the stator via multichannel slip rings; or at least one electrical contacting rotational coupling couples the electrical circuit with a stationary controller, for supply of control signaling, data, and electrical power.

15. The microfluidic chip controller of claim 1 further comprising: a sensor for measuring a property of the chip or a liquid contained therein; or an actuator, the sensor or actuator mounted to the body, or for mounting to the chip, and in electronic communication with the electrical circuit.

16. The microfluidic chip controller of claim 15 wherein: the sensor is provided to give feedback regarding a position of a fluid within the chip; or is a chemical, physical, or electronic sensor, including a temperature sensor, fluid dynamic sensor, or an optical sensor; or the actuator is provided to affect a position of a fluid within the chip; or is a chemical, physical, or electronic device, including a temperature regulator, fluid dynamic regulator, or an optical emitter.

17. A microfluidic chip controller comprising:
a rotor of a slip ring having a coupling for mounting to a centrifuge while permitting concurrent mounting of a microfluidic chip to the centrifuge, so that the rotor and chip are rotatable by the centrifuge;
the rotor having a first opening to a first pressurized fluid supply from a stator end of the slip ring;
a first pressurized fluid supply line having first and second ends, the first end for fluid communication with the first opening, and the second end adapted for fluid communication with at least one first port of the chip;
a flow control device mounted to the rotor for selectively controlling a supplied pressure to the first port; and
an electrical circuit for controlling the flow control device, whereby the microfluidic chip controller mounted with the chip to the centrifuge, with the first supply line connected to the first port of the chip, allows for controlled delivery of pressurized fluid into the chip during centrifugation.

18. A method for controlling a pressurized fluid supply in a microfluidic chip, the method comprising:
mounting a microfluidic chip control system to a centrifuge and mounting a microfluidic chip to the centrifuge, so that the chip and at least part of the control system are rotatable by the centrifuge;
providing the control system with at least one pressurized fluid supply;
coupling a pressurized fluid supply line of the control system at opposite ends for fluid communication between the at least one pressurized fluid supply and a port of the chip;
providing a flow control device of the control system in the supply line, mounted to the body for selectively controlling a supplied pressure to the first port; and
operating the flow control device for selectively controlling a pressure supplied to the chip.

19. The method of claim 18 wherein operating the flow control device comprises applying a pressure difference between a first and a second port of the chip to bubble a liquid in a reservoir, where the first port is coupled to the reservoir below a meniscus of the liquid, the second port is coupled to the reservoir above the meniscus, and the pressure applied at the second port is lower than that applied at the first port.

20. The method of claim 18 wherein operating the flow control device comprises applying a pressure to a channel to move a liquid from a first reservoir connected with the channel to a second reservoir.

21. The method of claim 20 wherein: the second reservoir is closer to an axis of rotation of the centrifuge than the first reservoir; the first reservoir is in a vial off of the chip, and the second reservoir is on the chip; applying the pressure to the channel to move the liquid comprises priming a siphon valve; or operating the flow control device comprises operating a plurality of flow control devices in a plurality of supply lines to selectively move the liquid in one of two or more directions.

22. The chip controller according to claim 1 in a kit with at least one of the following:
non-transitory computer readable program instructions for controlling the flow control device of the chip controller;

tubing for connecting the port of the microfluidic chip with the supply line;
a microfluidic chip;
a blade for a centrifuge; and 23. The chip controller according to claim 22 in a kit comprising at least two of the five alternatives of claim 22.

24. The microfluidic chip controller of claim 17 wherein: the coupling for mounting the rotor to the centrifuge is coaxial with a centre axis of the centrifuge; or the rotor is operatively coupled to the stator, and the stator forms part of the chip controller.

25. The microfluidic chip controller of claim 17 further comprising a part of the body shaped for mounting or supporting at least a part of the chip; and wherein the controller comprises one or more of the first pressurized fluid supply lines, and the second end or second ends of each are arranged with respect to the chip mounting or supporting for sealed connection with respective ports of the chip.

26. The microfluidic chip controller of claim 17 wherein the flow control device comprises a manifold between one or more first opening and the first port and a second port of the chip, and the rotor selectively couples respective stator supply lines to rotor supply lines intermittently or continuously.

27. A microfluidic chip controller integrated on a centrifugal blade comprising:
the blade having an axis for mounting on a centrifuge, and a holder for a microfluidic chip, so that the blade and chip are rotatable by the centrifuge;
the controller having a first opening to a first pressurized fluid supply mounted to the blade;
a first pressurized fluid supply line extending between the supply for coupling to one or more ports of the chip;
a flow control device mounted to the blade for selectively controlling a supplied pressure to the one or more ports; and
an electrical circuit for controlling the flow control device, whereby the microfluidic chip controller mounted with the chip to the centrifuge, allows for controlled delivery of pressurized fluid into the chip during centrifugation.

28. The microfluidic chip controller of claim 17 wherein the electrical circuit further comprises an electrical lead for coupling with an electrical component on or adjacent to the chip, the electrical lead adapted to supply power to, or provide signaling to, the electrical component.

29. The microfluidic chip controller of claim 17 wherein the electrical circuit comprises at least one electrical contacting rotational coupling that couples the electrical circuit with a stationary controller, the stationary controller adapted to supply control signaling, data, or electrical power to the flow control device.

30. The microfluidic chip controller of claim 17 wherein the microfluidic chip controller further comprises a joint for mounting to the chip or a support for the chip, and a mechanical actuator for controlling a motion of the chip in a plane of rotation of the centrifuge, the motion including at least a 5° rotation of the chip projected on the plane.

31. The microfluidic chip controller of claim 17 supplied in a kit along with at least one of the following:
non-transitory computer readable program instructions for controlling the flow control device of the chip controller;
tubing for connecting a port of the microfluidic chip with the supply line;
the stator, assembled with the rotor;
a microfluidic chip;
a blade for a centrifuge; and
a centrifuge.

32. The microfluidic chip controller of claim 31 supplied in a kit along with at least two of the five alternatives of claim 31.

33. The microfluidic chip controller of claim 27 further comprising a second pressurized fluid supply line communicating with a second pressurized fluid supply by a second opening in the body at a first end, the second supply line providing, at a second end, a coupling for sealed mounting to a second port of the chip, wherein the first and second supplies are adapted to be independently maintained at different pressures.

34. The microfluidic chip controller of claim 27 wherein the blade provides a mechanical attachment to the centrifuge at a position that does not interfere with a mounting position for the chip on the blade.

35. The microfluidic chip controller of claim 27 wherein the first supply line branches, to provide at the second end, a plurality of couplings for fluid connections to first ports respectively on each of a plurality of chips concurrently mountable to the blade.

36. The microfluidic chip controller of claim 27 wherein the electrical circuit further comprises an electrical lead for coupling with an electrical component on or adjacent the chip adapted to supply power to, or provide signaling to, the electrical component.

37. The microfluidic chip controller of claim 27 wherein the electrical circuit comprises at least one electrical contacting rotational coupling that couples the electrical circuit on the rotor with a stationary controller on the stator, the stationary controller adapted to supply control signaling, data, or electrical power to the flow control device.

38. The microfluidic chip controller of claim 27 wherein the blade further comprises a joint for mounting the chip or a support for the chip to the blade, and a mechanical actuator for controlling a motion of the chip in a plane of rotation of the centrifuge, the motion including at least a 5° rotation of the chip projected on the plane.

39. The microfluidic chip controller of claim 27 further comprising: a sensor for measuring a property of the chip or a liquid contained therein; or an actuator, the sensor or actuator mounted to the body, or for mounting to the chip, and in electronic communication with the electrical circuit.

40. The microfluidic chip controller of claim 27 wherein the first pressurized fluid supply comprises one of the following: an enclosed pressurized chamber; a pressurized chamber in communication with a negative or a positive pressure source; a pump; a pump that is mounted to the chip controller; a pump that is mounted to the chip controller near a centre of rotation of the centrifuge to limit a moment on a blade of the centrifuge by which the chip controller is mounted ring; a pump that is controlled by the electrical circuit; a pump with a power supply mounted to the chip controller; a pump with a power supply provided off of the centrifuge, and is connected to the pump by an electrical contacting rotational coupling, such as a slip ring; and a pressurized chamber in communication with a negative or a positive pressure source via a pneumatic slip ring.

41. The microfluidic chip controller of claim 27 provided in a kit with one or more of:
non-transitory computer readable program instructions for controlling flow control devices of the chip controller;
tubing for connecting a port of the microfluidic chip with the supply line;
a microfluidic chip; and
a centrifuge.

42. The microfluidic chip controller of claim 41 provided in a kit with two or more of the four alternatives of claim 41.

43. A microfluidic chip controller comprising:
a body having a coupling for mounting to a centrifuge while permitting concurrent mounting of a microfluidic chip to the centrifuge, so that the body and chip are rotatable by the centrifuge, the body having a chamber;
a first pressurized fluid supply line having first and second ends, the first end for fluid communication with the chamber, and the second end adapted for fluid communication with a first port of the chip;
a flow control device in the supply line, mounted to the body for selectively controlling a supplied pressure to the first port; and
an electrical circuit for controlling the flow control device provided, with at least part of the electrical circuit mounted to the body,
whereby the microfluidic chip controller, mounted with the chip to the centrifuge with the first supply line connected to the first port of the chip, allows for controlled delivery of pressurized fluid into the chip during centrifugation.

44. The microfluidic chip controller according to claim 1 wherein the first pressurized fluid supply line comprises a tubing, or a channel integrated into the body.

45. The microfluidic chip controller according to claim 27 wherein the first pressurized fluid supply line comprises a tubing, or a channel integrated into the blade.

46. The microfluidic chip controller according to claim 43 wherein the first pressurized fluid supply line is one of a tubing, or a channel integrated into the body.

47. The microfluidic chip controller according to claim 43 further comprising a second pressurized fluid supply line communicating with a second pressurized fluid supply by a second chamber in the body at a first end, the second supply line providing, at a second end, a coupling for sealed mounting to a second port of the chip, wherein the first and second supplies are adapted to be independently maintained at different pressures.

48. The microfluidic chip controller of claim 43 wherein the coupling provides a mechanical attachment to the centrifuge at a position that does not interfere with a mounting position for the chip on the blade.

49. The microfluidic chip controller of claim 43 wherein the first supply line branches, to provide at the second end, a plurality of couplings for fluid connections to first ports respectively on a plurality of chips that may be concurrently mounted by the body for centrifugation.

50. The microfluidic chip controller of claim 43 wherein the electrical circuit further comprises an electrical lead for coupling with an electrical component on or adjacent the chip adapted to supply power to, or provide signaling to, the electrical component.

51. The microfluidic chip controller of claim 43 wherein the electrical circuit comprises at least one electrical contacting rotational coupling that couples the electrical circuit on the rotor with a stationary controller on the stator, the stationary controller adapted to supply control signaling, data, or electrical power to the flow control device.

52. The microfluidic chip controller of claim 43 wherein the blade further comprises a joint for mounting the chip or a support for the chip to the blade, and a mechanical actuator for controlling a motion of the chip in a plane of rotation of the centrifuge, the motion including at least a 5° rotation of the chip projected on the plane.

53. The microfluidic chip controller of claim 43 further comprising: a sensor for measuring a property of the chip or a liquid contained therein; or an actuator, the sensor or actuator mounted to the body, or for mounting to the chip, and in electronic communication with the electrical circuit.

54. The microfluidic chip controller of claim 43 provided in a kit with one or more of:
non-transitory computer readable program instructions for controlling flow control devices of the chip controller;
tubing for connecting a port of the microfluidic chip with the supply line;
a microfluidic chip; and
a centrifuge.

55. The microfluidic chip controller of claim 54 provided in a kit with two or more of the four alternatives of claim 54.

56. The microfluidic chip controller of claim 43 wherein the chamber is:
an enclosed pressurized chamber; or is in communication with a negative or a positive pressure source.

57. The microfluidic chip controller of claim 43 wherein the chamber is pressurized by a pump that is mounted to the body.

58. The microfluidic chip controller of claim 57 wherein the pump is controlled by the electrical circuit.

59. The microfluidic chip controller of claim 43 wherein the chamber is open to ambient pressure.

60. The microfluidic chip controller of claim 43 wherein the chamber has an elastic volume.

61. A microfluidic chip controller comprising:
a body having a coupling for mounting to a centrifuge while permitting concurrent mounting of a microfluidic chip to the centrifuge, so that the body and chip are rotatable by the centrifuge, the body having a pump with an opening to a pressurized chamber;
a first pressurized fluid supply line having first and second ends, the first end for fluid communication with the chamber, and the second end adapted for fluid communication with a first port of the chip; and
an electrical circuit for controlling the pump, with at least part of the electrical circuit mounted to the body,
whereby the microfluidic chip controller, mounted with the chip to the centrifuge with the first supply line connected to the first port of the chip, allows for controlled delivery of pressurized fluid into the chip during centrifugation.

62. The microfluidic chip controller according to claim 61 wherein the first pressurized fluid supply line comprises a tubing, or a channel integrated into the body.

63. The microfluidic chip controller according to claim 61 further comprising a flow control device in the supply line, mounted to the body for selectively controlling a supplied pressure to the first port, the flow control device controlled by the electrical circuit.

64. The microfluidic chip controller of claim 61 wherein the coupling provides a mechanical attachment to the centrifuge at a position that does not interfere with a mounting position for the chip.

65. The microfluidic chip controller of claim 61 wherein the electrical circuit comprises at least one electrical contacting rotational coupling that couples the electrical circuit on the body with a stationary controller, the stationary controller adapted to supply control signaling, data, or electrical power to the flow control device.

66. The microfluidic chip controller of claim 61 provided in a kit with one or more of:
non-transitory computer readable program instructions for controlling flow control devices of the chip controller;

tubing for connecting a port of the microfluidic chip with the supply line;
a microfluidic chip; and
a centrifuge.

67. The microfluidic chip controller of claim 66 provided in a kit with two or more of the four alternatives of claim 66.

68. A microfluidic chip controller comprising:
a body having a coupling for mounting to a centrifuge while permitting concurrent mounting of a microfluidic chip to the centrifuge, so that the body and chip are rotatable by the centrifuge, the body with an opening to ambience;
a first pressurized fluid supply line having first and second ends, the first end for fluid communication with the opening to ambience, and the second end adapted for fluid communication with a first port of the chip;
a flow control device in the supply line, mounted to the body for selectively controlling a supplied pressure to the first port; and
an electrical circuit for controlling the flow control device, with at least part of the electrical circuit mounted to the body,
whereby the microfluidic chip controller, mounted with the chip to the centrifuge with the first supply line connected to the first port of the chip, allows for controlled opening to ambient pressure into the chip during centrifugation.

69. The microfluidic chip controller according to claim 68 wherein the first pressurized fluid supply line comprises a tubing, or a channel integrated into the body.

70. The microfluidic chip controller of claim 68 wherein the coupling provides a mechanical attachment to the centrifuge at a position that does not interfere with a mounting position for the chip.

71. The microfluidic chip controller of claim 68 wherein the electrical circuit comprises at least one electrical contacting rotational coupling that couples the electrical circuit on the body with a stationary controller, the stationary controller adapted to supply control signaling, data, or electrical power to the flow control device.

72. The microfluidic chip controller of claim 68 provided in a kit with one or more of:
non-transitory computer readable program instructions for controlling one or more flow control devices of the chip controller;
tubing for connecting a port of the microfluidic chip with the supply line;
a microfluidic chip;
a blade for a centrifuge; and
a centrifuge.

73. The microfluidic chip controller of claim 72 provided in a kit with two or more of the five alternatives of claim 72.

74. A microfluidic chip controller integrated on a centrifugal blade, comprising:
the blade having a coupling for mounting to a centrifuge while permitting concurrent mounting of a microfluidic chip to the blade, so that the blade and chip are rotatable by the centrifuge, the body with an opening to ambience;
a first pressurized fluid supply line having first and second ends, the first end for fluid communication with the opening to ambience, and the second end adapted for fluid communication with a first port of the chip;
a flow control device in the supply line, mounted to the body for selectively controlling a supplied pressure to the first port; and
an electrical circuit for controlling the flow control device, with at least part of the electrical circuit mounted to the body, whereby the microfluidic chip controller, mounted with the chip to the centrifuge with the first supply line connected to the first port of the chip, allows for controlled opening to ambient pressure into the chip during centrifugation.

75. The microfluidic chip controller according to claim 74 wherein the first pressurized fluid supply line comprises a tubing, or a channel integrated into the body.

76. The microfluidic chip controller of claim 74 wherein the coupling provides a mechanical attachment to the centrifuge at a position that does not interfere with a mounting position for the chip.

77. The microfluidic chip controller of claim 74 wherein the electrical circuit comprises at least one electrical contacting rotational coupling that couples the electrical circuit on the body with a stationary controller, the stationary controller adapted to supply control signaling, data, or electrical power to the flow control device.

78. The microfluidic chip controller of claim 74 provided in a kit with one or more of:
non-transitory computer readable program instructions for controlling one or more flow control devices of the chip controller;
tubing for connecting a port of the microfluidic chip with the supply line;
a microfluidic chip; and
a centrifuge.

79. The microfluidic chip controller of claim 78 provided in a kit with two or more of the four alternatives of claim 78.

\* \* \* \* \*

UNITED STATES PATENT AND TRADEMARK OFFICE
CERTIFICATE OF CORRECTION

PATENT NO. : 10,702,868 B2
APPLICATION NO. : 15/124236
DATED : July 7, 2020
INVENTOR(S) : Teodor Veres et al.

Page 1 of 1

It is certified that error appears in the above-identified patent and that said Letters Patent is hereby corrected as shown below:

In the Claims

In Claim 22, last phrase should read:
"a blade for a centrifuge; and
a centrifuge."

Signed and Sealed this
Twenty-second Day of October, 2024

Katherine Kelly Vidal
*Director of the United States Patent and Trademark Office*